United States Patent
Morita et al.

(10) Patent No.: US 12,118,204 B2
(45) Date of Patent: Oct. 15, 2024

(54) DISPLAY CONTROL DEVICE AND DISPLAY CHANGE METHOD WITH USER TOUCH CONTROL

(71) Applicant: Clarion Co., Ltd., Saitama (JP)

(72) Inventors: Manabu Morita, Saitama (JP); Keita Katsuno, Saitama (JP)

(73) Assignee: Clarion Co., Ltd., Saitama (JP)

( * ) Notice: Subject to any disclaimer, the term of this patent is extended or adjusted under 35 U.S.C. 154(b) by 881 days.

(21) Appl. No.: 17/256,830

(22) PCT Filed: Jul. 1, 2019

(86) PCT No.: PCT/JP2019/026003
§ 371 (c)(1),
(2) Date: Dec. 29, 2020

(87) PCT Pub. No.: WO2020/009047
PCT Pub. Date: Jan. 9, 2020

(65) Prior Publication Data
US 2021/0157480 A1    May 27, 2021

(30) Foreign Application Priority Data
Jul. 5, 2018    (JP) .................................. 2018-128055

(51) Int. Cl.
*G06F 3/048* (2013.01)
*G06F 3/04845* (2022.01)
(Continued)

(52) U.S. Cl.
CPC ...... *G06F 3/04886* (2013.01); *G06F 3/04845* (2013.01); *G06F 3/0485* (2013.01); *G06F 2203/04803* (2013.01)

(58) Field of Classification Search
CPC .... G06F 1/1601; G06F 1/1616; G06F 1/1647; G06F 3/0202; G06F 3/03543;
(Continued)

(56) References Cited

U.S. PATENT DOCUMENTS 4,703,321 A * 10/1987 Barker ................ G06F 3/04845
345/619
6,310,631 B1 * 10/2001 Cecco ................... G06F 3/0481
715/792
(Continued)

FOREIGN PATENT DOCUMENTS

CN    102360266 A  *  2/2012
CN    106775314 A  *  5/2017  ........... G06F 3/0484
(Continued)

OTHER PUBLICATIONS

Extended European Search Report dated Feb. 28, 2022 for European Patent Application No. 19830404.0.
(Continued)

*Primary Examiner* — Linh K Pham
(74) *Attorney, Agent, or Firm* — Volpe Koenig

(57) ABSTRACT

The sizes and the positional relationship of a plurality of divided regions provided in a display region are changed in a more convenient manner. An information control device includes: an operation detection unit configured to detect touch operation of a user performed on a pointer being provided at an intersection of division lines dividing a display screen of a display into three or more divided regions; and a layout setting unit configured to transition display of the display between a plurality of layouts set in advance according to the detected touch operation performed on the pointer. As a transition process of the plurality of layouts, the layout setting unit moves the pointer and deforms the division lines and the three or more divided
(Continued)

regions imitating an elastic object according to drag as the touch operation performed on the pointer.

10 Claims, 16 Drawing Sheets

(51) Int. Cl.
*G06F 3/0485* (2022.01)
*G06F 3/04886* (2022.01)

(58) Field of Classification Search
CPC .. G06F 18/2431; G06F 3/012; G06F 3/04815; G06F 3/04886; G06F 3/04845; G06F 3/0485; G06F 2203/04803; G06F 3/0481; G06F 3/147; G06F 3/04883; G06F 3/0488; G06F 3/017; G06F 3/04842; G06F 3/0486; G09G 2340/04; G09G 2340/0464; G09G 2354/00; G09G 5/38; G09G 5/14

See application file for complete search history.

(56) References Cited

U.S. PATENT DOCUMENTS

| | | | | |
|---|---|---|---|---|
| 9,619,140 | B2* | 4/2017 | Clausen | G06F 3/04883 |
| 9,916,073 | B1* | 3/2018 | Szeto | G06F 3/041 |
| 10,198,178 | B2 | 2/2019 | Sato | |
| 2003/0076362 | A1* | 4/2003 | Terada | G06F 3/0486 |
| | | | | 715/781 |
| 2004/0008224 | A1* | 1/2004 | Molander | G09G 5/00 |
| | | | | 345/764 |
| 2010/0313110 | A1* | 12/2010 | Claridge | G06F 40/18 |
| | | | | 715/801 |
| 2011/0072400 | A1* | 3/2011 | Watanabe | H04M 1/724 |
| | | | | 345/173 |
| 2012/0084717 | A1* | 4/2012 | Yao | G06F 3/0481 |
| | | | | 715/792 |
| 2013/0021377 | A1* | 1/2013 | Doll | G09G 5/14 |
| | | | | 345/649 |
| 2013/0061170 | A1* | 3/2013 | Friedlander | G06F 3/0488 |
| | | | | 715/800 |
| 2013/0215061 | A1* | 8/2013 | Rydenhag | G06F 3/017 |
| | | | | 345/173 |
| 2013/0307801 | A1* | 11/2013 | Nam | H04M 1/72448 |
| | | | | 345/173 |
| 2014/0208262 | A1* | 7/2014 | Huang | G06F 3/0486 |
| | | | | 715/800 |
| 2015/0153844 | A1* | 6/2015 | Jung | G06F 3/04812 |
| | | | | 345/158 |
| 2015/0169216 | A1* | 6/2015 | Cho | G06F 3/04883 |
| | | | | 715/764 |
| 2015/0317026 | A1* | 11/2015 | Choi | G06F 3/0481 |
| | | | | 345/660 |
| 2015/0324093 | A1* | 11/2015 | Wada | G06F 3/04842 |
| | | | | 715/763 |
| 2016/0034156 | A1* | 2/2016 | Vranjes | G06F 3/04842 |
| | | | | 715/800 |
| 2016/0196057 | A1* | 7/2016 | Choi | G06F 3/04842 |
| | | | | 715/773 |
| 2016/0239203 | A1* | 8/2016 | Sato | G06F 3/04883 |
| 2017/0007921 | A1* | 1/2017 | Baba | G06F 3/04845 |
| 2017/0090709 | A1* | 3/2017 | Maekawa | G06F 3/0486 |
| 2017/0102857 | A1* | 4/2017 | Badiger | G06F 3/04847 |
| 2019/0012078 | A1 | 1/2019 | Ishiguro | |

FOREIGN PATENT DOCUMENTS

| | | |
|---|---|---|
| EP | 3037938 A1 | 6/2016 |
| JP | 2014-109808 A | 6/2014 |
| JP | 2015-087861 A | 5/2015 |
| JP | 2018-092254 A | 6/2018 |
| WO | 2017/111075 A1 | 6/2017 |

OTHER PUBLICATIONS

Communication Pursuant to Article 94(3) EPC issued on Mar. 20, 2024 for European Patent Application No. 19830404.0.

* cited by examiner

Fig.9A

| LAYOUT BEFORE TRANSITION | TOUCH OPERATION | LAYOUT OF TRANSITION TARGET |
|---|---|---|
| L11 | TOUCH ON FIRST, SECOND, OR THIRD REGION, RIGHTWARD DRAG | L1 |
| L1 | TOUCH ON SECOND OR THIRD REGION, LEFTWARD DRAG | L11 |
| L1 | TOUCH ON THIRD REGION, RIGHTWARD DRAG | L2 |
| L1 | TOUCH ON SECOND REGION, RIGHTWARD DRAG | L6 |
| L1 | TOUCH ON UPPER SIDE OF FIRST REGION, LEFTWARD DRAG | L2 |
| L1 | TOUCH ON LOWER SIDE OF FIRST REGION, LEFTWARD DRAG | L6 |
| L2 | TOUCH ON SECOND OR THIRD REGION, RIGHTWARD DRAG | L3 |
| L2 | TOUCH ON SECOND OR THIRD REGION, LEFTWARD DRAG | L1 |
| L2 | TOUCH ON FIRST REGION, LEFTWARD DRAG | L3 |
| L2 | TOUCH ON FIRST REGION, RIGHTWARD DRAG | L1 |
| L3 | TOUCH ON SECOND OR THIRD REGION, RIGHTWARD DRAG | L4 |
| L3 | TOUCH ON SECOND OR THIRD REGION, LEFTWARD DRAG | L2 |
| L3 | TOUCH ON FIRST REGION, LEFTWARD DRAG | L4 |
| L3 | TOUCH ON FIRST REGION, RIGHTWARD DRAG | L3 |

| LAYOUT BEFORE TRANSITION | TOUCH OPERATION | LAYOUT OF TRANSITION TARGET |
|---|---|---|
| L4 | TOUCH ON SECOND OR THIRD REGION, RIGHTWARD DRAG | REPEL |
| | TOUCH ON SECOND REGION, LEFTWARD DRAG | L3 |
| | TOUCH ON THIRD REGION, LEFTWARD DRAG | L5 |
| | TOUCH ON FIRST REGION, LEFTWARD DRAG | L41 |
| | TOUCH ON UPPER SIDE OF FIRST REGION, RIGHTWARD DRAG | L3 |
| | TOUCH ON LOWER SIDE OF FIRST REGION, RIGHTWARD DRAG | L5 |
| L41 | TOUCH ON FIRST, SECOND, OR THIRD REGION, RIGHTWARD DRAG | L4 |
| L5 | TOUCH ON SECOND OR THIRD REGION, LEFTWARD DRAG | L6 |
| | TOUCH ON SECOND OR THIRD REGION, RIGHTWARD DRAG | L4 |
| | TOUCH ON FIRST REGION, RIGHTWARD DRAG | L6 |
| | TOUCH ON FIRST REGION, LEFTWARD DRAG | L4 |
| L6 | TOUCH ON SECOND OR THIRD REGION, LEFTWARD DRAG | L1 |
| | TOUCH ON SECOND OR THIRD REGION, RIGHTWARD DRAG | L5 |
| | TOUCH ON FIRST REGION, RIGHTWARD DRAG | L1 |
| | TOUCH ON FIRST REGION, LEFTWARD DRAG | L5 |

| LAYOUT BEFORE TRANSITION | TOUCH OPERATION | LAYOUT OF TRANSITION TARGET |
|---|---|---|
| L101H | LEFTWARD DRAG | L104H |
| | RIGHTWARD DRAG | L102H |
| | DOWNWARD DRAG | L101 |
| L101 | UPWARD DRAG | L101H |
| | DOWNWARD DRAG | L101L |
| | RIGHTWARD DRAG | L102 |
| | LEFTWARD DRAG | L104 |
| L101L | UPWARD DRAG | L101 |
| | RIGHTWARD DRAG | L102L |
| | LEFTWARD DRAG | L104L |
| L102H | LEFTWARD DRAG | L103H |
| | DOWNWARD DRAG | L102 |
| L102 | UPWARD DRAG | L102H |
| | DOWNWARD DRAG | L102L |
| | LEFTWARD DRAG | L103 |
| L102L | UPWARD DRAG | L102 |
| | LEFTWARD DRAG | L103L |
| L103H | LEFTWARD DRAG | L104H |
| | DOWNWARD DRAG | L103 |
| L103 | UPWARD DRAG | L103H |
| | DOWNWARD DRAG | L103L |
| | LEFTWARD DRAG | L104 |
| L103L | UPWARD DRAG | L103 |
| | LEFTWARD DRAG | L104L |
| L104H | RIGHTWARD DRAG | L101H |
| | DOWNWARD DRAG | L104 |
| L104 | UPWARD DRAG | L104H |
| | DOWNWARD DRAG | L104L |
| | RIGHTWARD DRAG | L101 |
| L104L | UPWARD DRAG | L104 |
| | RIGHTWARD DRAG | L101L |

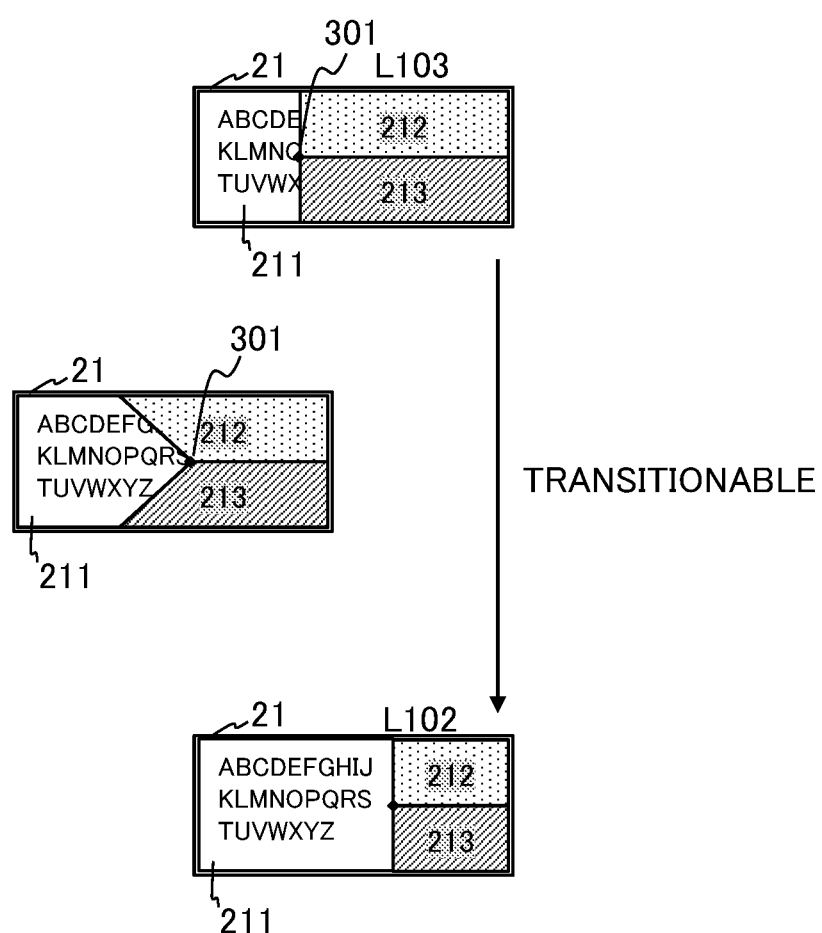

DISPLAY CONTROL DEVICE AND DISPLAY CHANGE METHOD WITH USER TOUCH CONTROL

TECHNICAL FIELD

The present invention relates to an information control device and a display change method. The present invention claims priority to Japanese Patent Application No. 2018-128055 filed on Jul. 5, 2018, the contents of which are incorporated herein by reference regarding the designated states where incorporation by reference to literature is permitted.

BACKGROUND ART

As an invention relating to information display on a display, for example, PTL 1 discloses an electronic device including a display unit that performs display on a display region, an operation detection unit that detects an operation with respect to the display region, and a display control unit that controls the display unit. Further, PTL 1 describes the following: the display control unit has a division display mode in which a first display region included in the display region is divided into a plurality of divided regions and display of each of the plurality of divided regions is independently controlled. In the division display mode, the display control unit causes the display unit to display one operation target image that enables setting so as to enable setting for each of the plurality of divided regions.

CITATION LIST

Patent Literature

PTL 1: JP 2015-87861 A

SUMMARY OF INVENTION

Technical Problem

According to the electronic device of PTL 1, a user can change the sizes of the plurality of divided regions in the first display region. However, the positional relationship of the plurality of divided regions is fixed, and the user thus is not allowed to change the positional relationship of the plurality of divided regions.

The present invention is made in view of the circumstances as described above, and has an object to enable change of sizes and positional relationship of a plurality of divided regions provided in a display region in a more convenient manner.

Solution to Problem

The present application includes a plurality of solutions to at least a part of the problems described above. One example of the solutions is as follows. In order to solve the problems described above, an information control device according to an aspect of the present invention includes: an operation detection unit configured to detect touch operation of a user performed on a pointer being provided at an intersection of division lines dividing a display screen of a display into three or more divided regions; and a layout setting unit configured to transition display of the display between a plurality of layouts set in advance according to the detected touch operation performed on the pointer. As a transition process of the plurality of layouts, the layout setting unit moves the pointer and deforms the division lines and the three or more divided regions imitating an elastic object according to drag as the touch operation performed on the pointer.

Advantageous Effects of Invention

According to the present invention, the sizes and the positional relationship of the plurality of divided regions provided in the display region can be changed in a more convenient manner.

Problems, configurations, and effects other than those described above will become apparent in the following description of the embodiments.

BRIEF DESCRIPTION OF DRAWINGS

FIG. 9A to FIG. 9B is a diagram illustrating an example of a transition table corresponding to the first operation example.

FIG. 15 is a diagram illustrating an example of a transition table corresponding to the second operation example.

FIG. 16 is a diagram illustrating an example of a case in which an information amount to be displayed is changed according to the sizes of the divided regions.

DESCRIPTION OF EMBODIMENTS

With reference to the drawings, an embodiment of the present invention is described below. Note that, in all the drawings for describing the embodiment, in principle, the identical members are denoted with the identical reference symbols, and repeated description therefor is omitted as appropriate. In the following embodiment, it goes without saying that constituent elements therein (including element steps and the like) are not necessarily essential unless otherwise particularly stated or incontrovertibly considered as essentials in principle. When the expressions "constituted of A", "being formed of A", "including A", and "comprising A" are given, it goes without saying that the expressions are not intended to exclude elements other than A unless A otherwise is clearly stated as the only element. Similarly, in the following embodiment, when shapes, positional relationships, and the like of the constituent elements and the like are referred to, substantially approximate or similar shapes and the like are included unless otherwise particularly stated or incontrovertibly considered to be different in principle or the like.

<Configuration Example of Onboard Device According to Embodiment of Present Invention>

An embodiment of the present invention will be described below by taking an example of a case in which an information control device is an onboard device.

Figure 1:
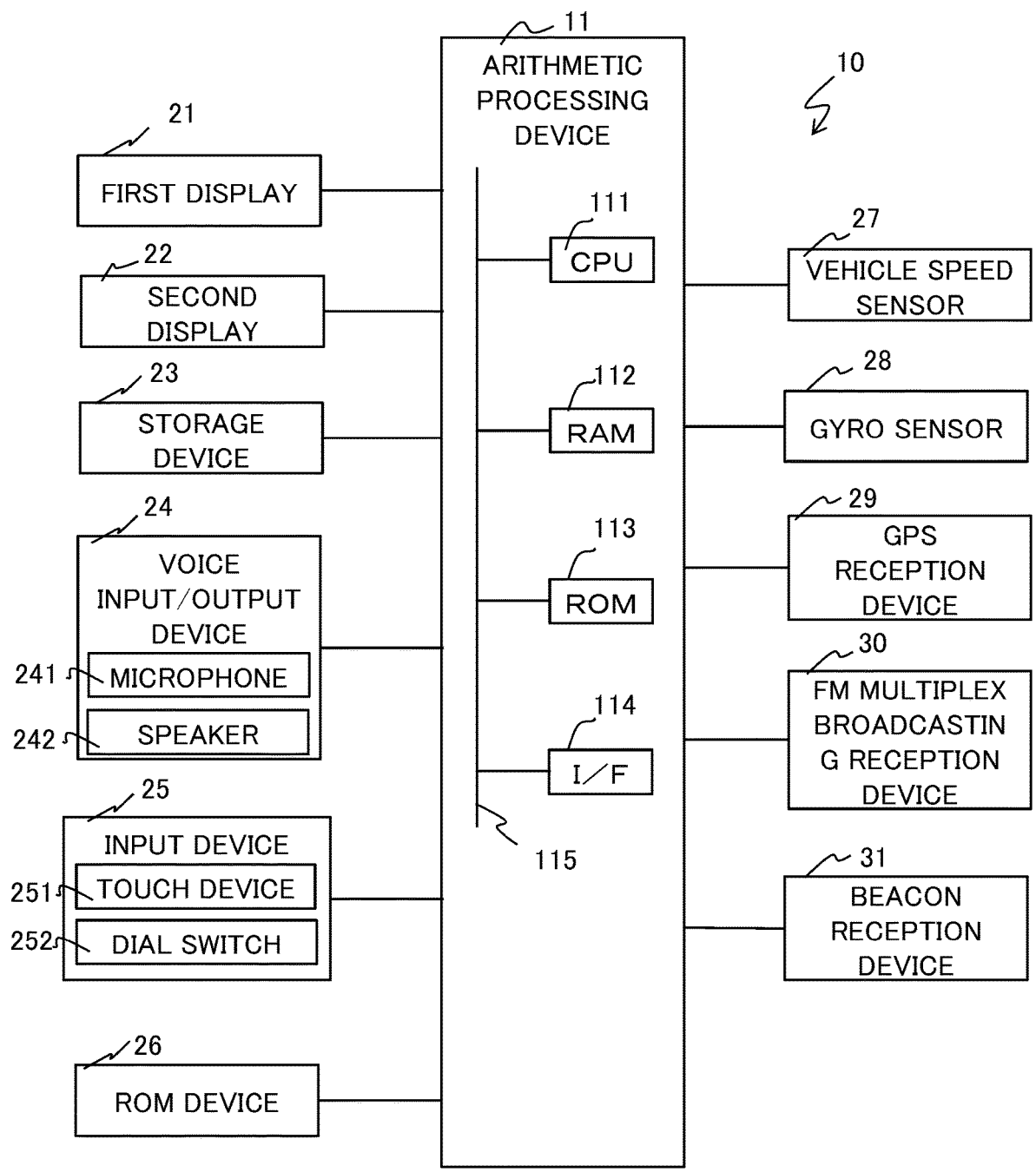
FIG. 1 is a block diagram illustrating a configuration example of an onboard device according to an embodiment of the present invention.

FIG. 1 illustrates a configuration example of an onboard device 10 according to an embodiment of the present invention. The onboard device 10 can be implemented with an onboard navigation device having a navigation function, for example. Thus, the onboard device 10 is, for example, a box-like device including a first display 21 on a front surface, and is housed in a console panel inside a vehicle. The onboard device 10 may include a mounting tool (bracket) to be mounted to the console panel, and may be mounted, for example, above the console panel inside the vehicle through intermediation of the mounting tool.

Here, the navigation function refers to a function that a navigation device usually has, for example, displaying map information, searching for a recommended route, and navigating from a departure place (or a current place) to a target place, and displaying traffic information. Note that the onboard device 10 is not limited to a dedicated navigation device, and may be, for example, a smartphone, a tablet terminal device, and a personal data assistance (PDA). In this case, the navigation function is provided by an application installed in those devices or a server device to which those devices can connect.

The onboard device 10 can display, in addition to the navigation screen related to the navigation function, an air conditioning screen for setting a temperature, an air flow rate, and the like of an air conditioner, an audio screen for selecting music of audio and setting volume and the like, a screen of an application to be executed by a wirelessly connected smartphone, a phone screen for outgoing and incoming phone calls, and the like.

As illustrated in the figure, the onboard device 10 includes an arithmetic processing device 11, the first display 21, a second display 22, a storage device 23, a voice input/output device 24, an input device 25, and a read only memory (ROM) device 26.

The onboard device 10 further includes a vehicle speed sensor 27, a gyro sensor 28, a global position system (GPS) reception device 29, an FM multiplex broadcasting reception device 30, and a beacon reception device 31.

The arithmetic processing device 11 is a central unit that performs various types of processing of the onboard device 10. The arithmetic processing device 11 detects a current place through use of information output from various sensors such as the vehicle speed sensor 27, and the GPS reception device 29, for example. Based on the acquired current place information, the arithmetic processing device 11 reads map information required for display from the storage device 23 and the ROM device 26. The arithmetic processing device 11 develops the read map information into graphics and outputs a signal to display a mark indicating the current place in a form of overlapping on the graphics. The arithmetic processing device 11 further calculates a recommended route connecting a departure place and a target place that are instructed from a user (a driver or a passenger), through use of map information and the like stored in the storage device 23 or the ROM device 26. The arithmetic processing device 11 navigates along the route by outputting a predetermined signal to a speaker 242 and the first display 21.

The arithmetic processing device 11 sets divided regions, which are obtained by dividing the display screen of the first display 21 with a predetermined ratio. The arithmetic processing device 11 displays predetermined display information according to a layout (arrangement pattern) of the divided regions in each divided region in a predetermined display mode. In addition, the arithmetic processing device 11 can move the divided region set in the first display 21 to the second display 22 to display the divided region in the second display 22, and can display the divided region moved and displayed in the second display 22 back to the first display 21.

The arithmetic processing device 11 as described above includes a central processing unit (CPU) 111 that executes various types of processing for performing arithmetic operations and controlling the devices, a random access memory (RAM) 112 that temporarily stores map information, arithmetic data, and the like having been read from a memory device such as the storage device 23 and a ROM 113, the ROM 113 that stores a boot program and the like executed by the CPU 111, an interface (I/F) 114 for connecting various types of hardware to the arithmetic processing device 11, and a bus 115 that connects those components to each other.

The first display 21 is installed at the center of the console panel provided on the front surface inside the vehicle, for example. The first display 21 is a unit that displays graphics information. The first display 21 is formed of a liquid crystal display, an organic electroluminescence (EL) display, or the like, for example. Note that, as described later, a transparent touch panel 251 is stacked on the first display 21. Therefore, a user can perform a touch operation on the first display 21 (touch panel 251 stacked thereon).

The second display 22 is installed in an instrument panel provided in front of a driver's seat, for example. For example, in a case of a vehicle in which a steering wheel is installed on a left side as in a US specification vehicle, the second display 22 is set on a left side to the first display 21 installed at the center of the console panel as seen from a user.

Note that, it is desired that a display for displaying a speed indicator, a tachometer, and the like, the display being provided to the vehicle in advance, be also used for the second display 22. As a matter of course, the second display 22 dedicated to the onboard device 10 may be provided. The second display 22 is a unit that displays graphics information. The second display 22 is formed of a liquid crystal display, an organic EL display, or the like, for example.

Figure 2:
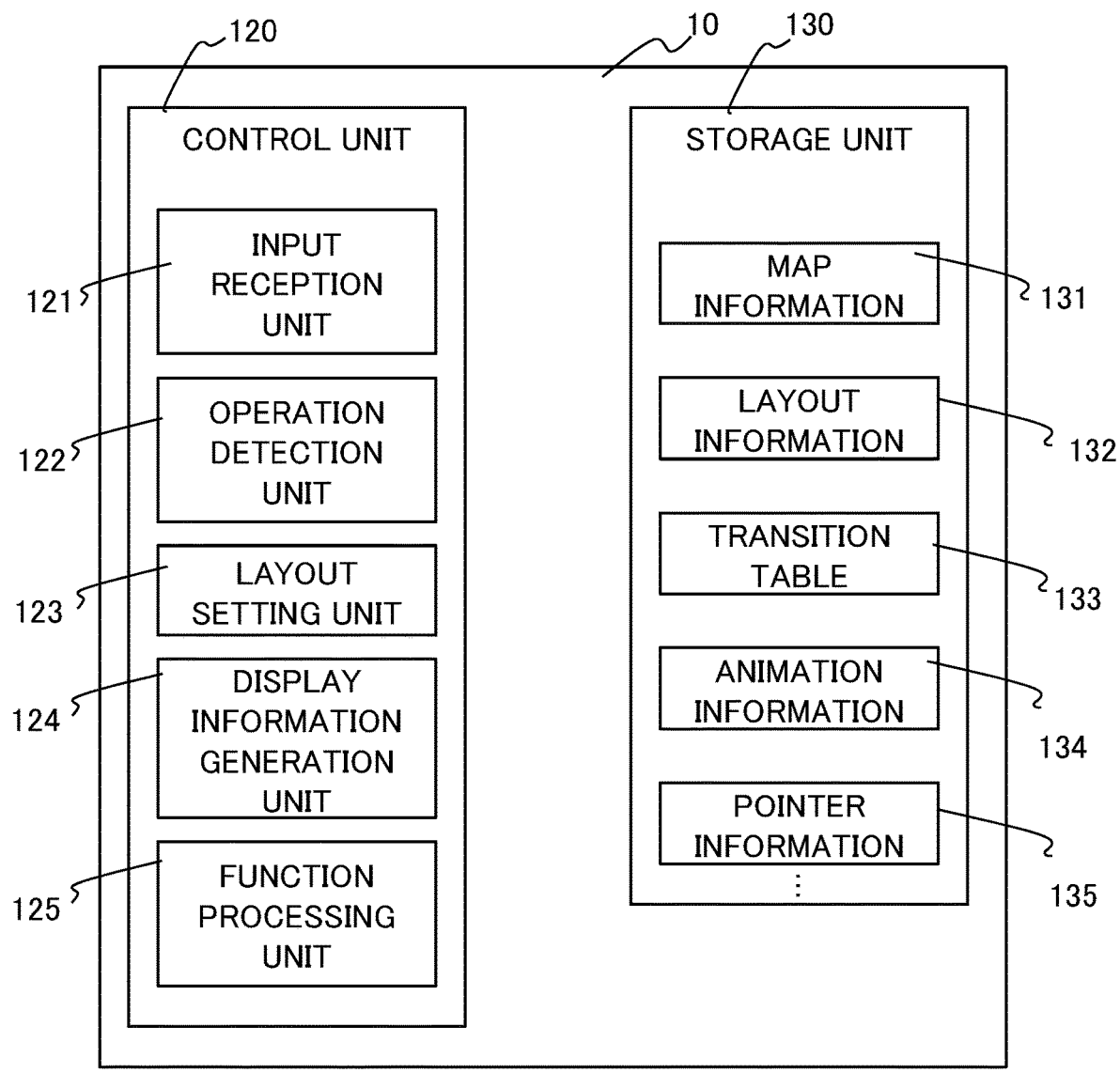
FIG. 2 is a diagram illustrating an example of functional blocks of the onboard device.

The storage device 23 is formed of a storage medium capable of performing at least reading and writing, such as a hard disk drive (HDD) and a non-volatile memory card. In the storage device 23, for example, various pieces of information used by the arithmetic processing device 11 (for example, map information 131, layout information 132, a transition table 133, animation information 134, pointer information 135 (all of which are illustrated in FIG. 2), and the like) are stored.

The voice input/output device 24 includes a microphone 241 as a voice input device and the speaker 242 as a voice output device. The microphone 241 collects voice or sound outside the onboard device 10, such as voice that is made by a driver or a passenger (user utterance). The speaker 242 outputs guidance to the driver or the like generated in the arithmetic processing device 11 as voice.

The input device 25 is a device that receives an instruction input from a user. The input device 25 includes the touch panel 251, the dial switch 252, a scroll key being another hard switch, and the like (not illustrated). The input device 25 outputs information in accordance with an operation of the keys and switches to another device such as the arithmetic processing device 11.

The touch panel 251 is formed of a transparent material, and is stacked on the display screen of the first display 21. The touch panel 251 detects a touch operation by a finger of a user or a touch pen (touch-on (contact), drag (move in a contact state), and touch-off (release of contact)). Thus, while visually recognizing the display screen of the first display 21, a user can input various operations by touching the display screen (actually, the touch panel 251). A position of a touch operation of a user is specified based on xy coordinates set on the touch panel 251, for example. The touch panel 251 is formed of input detection elements of a capacitive sensing type, for example.

The ROM device 26 is formed of a storage medium capable of at least reading a ROM exemplified by a compact disk (CD)-ROM and a digital versatile disk (DVD)-ROM, an integrated circuit (IC) card, and the like. In the storage medium, for example, video data, voice data, and the like are stored.

The vehicle speed sensor 27 is a sensor that outputs a value used for calculating vehicle speed. The gyro sensor 28 is a sensor that is formed of an optical fiber gyroscope, an oscillation gyroscope, or the like, and detects angular velocity of rotation of a moving body (vehicle). The GPS reception device 29 is configured to measure a current place, a traveling speed, and a traveling direction of the moving body by receiving signals from GPS satellites and measuring distances between the moving body and the GPS satellites and rates of change of the distances with respect to three or more satellites. Those devices are used for the arithmetic processing device 11 in order to detect a current place of a vehicle to which the onboard device 10 is mounted.

The FM multiplex broadcasting reception device 30 receives an FM multiplex broadcasting signal that is transmitted from an FM broadcasting station. FM multiplex broadcasting includes an outline of current traffic information of VICS information, regulation information, service area/parking area (SA/PA) information, parking lot information, weather information, text information provided as FM multiplex general information by a radio station, and the like.

The beacon reception device 31 receives the outline of current traffic information such as VICS information, the regulation information, the service area/parking area (SA/PA) information, the parking lot information, the weather information, an emergency alert, and the like. The beacon reception device 31 may be, for example, an optical beacon that performs communication through light or a radio wave beacon that performs communication through a radio wave.

The above has described the hardware configuration of the onboard device 10.

Next, functional blocks illustrating a functional configuration of the onboard device 10 will be described. FIG. 2 illustrates an example of functional blocks of the onboard device 10.

The onboard device 10 includes a control unit 120 and a storage unit 130.

The control unit 120 includes an input reception unit 121, an operation detection unit 122, a layout setting unit 123, a display information generation unit 124, and a function processing unit 125.

The input reception unit 121 is a functional block that receives an instruction and an input of information from a user through the dial switch 252 of the input device 25 or other hard switches. For example, the input reception unit 121 receives setting of a departure place and a target place, a search instruction for a recommended route, and the like through the input device 25 from a user.

The operation detection unit 122 is a functional block that detects touch operation on the touch panel 251 of the input device 25 performed by a finger of the user or a dedicated touch pen. Specifically, the operation detection unit 122 detects touch-on, drag, and touch-off with respect to the touch panel 251. The operation detection unit 122 specifies xy coordinates on the touch panel 251 subjected to a touch operation.

The operation detection unit 122 can also detect a plurality of (for example, two) touches on the touch panel 251 within a predetermined time period (for example, 0.5 seconds), and can specify xy coordinates on the touch panel 251 which indicate each touch position.

When the operation detection unit 122 detects these touch operations (including touch-off), the operation detection unit 122 outputs a type of the touch operation and xy coordinates of the touch operation to the layout setting unit 123.

The layout setting unit 123 is a functional block that sets divided regions in the display screen. Specifically, the layout setting unit 123 sets a size and a position of a full screen region, which uses the whole display screen as one display region, or sizes and positions of divided regions, which are obtained by dividing the display screen into a plurality of (for example, 3) regions. In addition, the layout setting unit 123 executes animation display that presents a process of transition of a layout.

The display information generation unit 124 is a functional block that generates display information to be displayed in the display region.

The function processing unit 125 is a functional block that, when an operation reception button is included in the divided region of the first display 21 and a touch operation on the operation reception button is performed, performs processing for implementing a predetermined function according to the touch operation. The function herein refers to, for example, the navigation function, air conditioner setting, reproduction of music, outgoing and incoming phone calls, and the like.

The storage unit 130 is a functional block that stores predetermined information. The storage unit 130 is implemented by the ROM 113 and the storage device 23. The storage unit 130 stores the map information 131, the layout information 132, the transition table 133, the animation information 134, the pointer information 135, and other various pieces of information.

The map information 131 records information on land forms, roads, and the like that are used for the navigation function. The layout information 132 records information of a plurality of layouts (arrangement patterns) in which the sizes and the positions of the plurality of divided regions in the display screen are different from each other, and information indicating the currently displayed layout.

The transition table 133 corresponds to conversion information according to the present invention. The transition table 133 records correspondence between the touch operation and transition between the layouts. The animation information 134 records information for displaying animation presenting transition process between the layouts. The pointer information 135 records information related to the position of a pointer 301 (FIG. 10) in each layout, the positions of pointer movement points 303 (FIG. 11), and the positions of touch regions to (FIG. 11).

The above has described the functional blocks of the onboard device 10.

Note that the functional blocks of the onboard device 10, which are the input reception unit 121, the operation detection unit 122, the layout setting unit 123, the display information generation unit 124, and the function processing unit 125, are implemented by the CPU 111 executing predetermined programs. The programs are stored in the ROM 113 of the onboard device 10 or the storage device 23, and are loaded on the RAM 112 at the time of execution and executed by the CPU 111.

Note that each functional block illustrated in FIG. 2 is classified according to its main processing contents, for the sake of easier understanding of the functions of the onboard device 10 implemented in the present embodiment. Therefore, how each function is classified and referred to does not limit the present invention. Each configuration of the onboard device 10 can be classified into more components, according to the processing contents. Each configuration can be classified so that one component executes more processing.

All or a part of the functional blocks may be constituted by hardware (an integrated circuit such as an ASIC, or the like) implemented in a computer. Processing of each of the functional blocks may be executed by one piece of hardware, or may be executed by a plurality of pieces of hardware.

<Information Display Using Both of First Display 21 and Second Display 22>

Next, two types of operation examples in which information display is performed by the onboard device 10 using both of the first display 21 and the second display 22 will be described.

The onboard device 10 executes one of a first operation example and a second operation example described below. Note that the onboard device 10 may be capable of executing both of the first operation example and the second operation example, and may execute one selected by the user.

First Operation Example

First of all, the first operation example will be described. As the first operation example, the onboard device 10 can divide the display screen of the first display 21 into a plurality of divided regions, and display different pieces of information in respective divided regions. In addition, the onboard device 10 can change the sizes and the positional relationship of the plurality of divided regions according to the touch operation from the user on any position of the first display 21.

In addition, the onboard device 10 can move the divided region to the second display 22 to display the divided region in the second display 22 according to the touch operation from the user on the first display 21.

Figure 3:
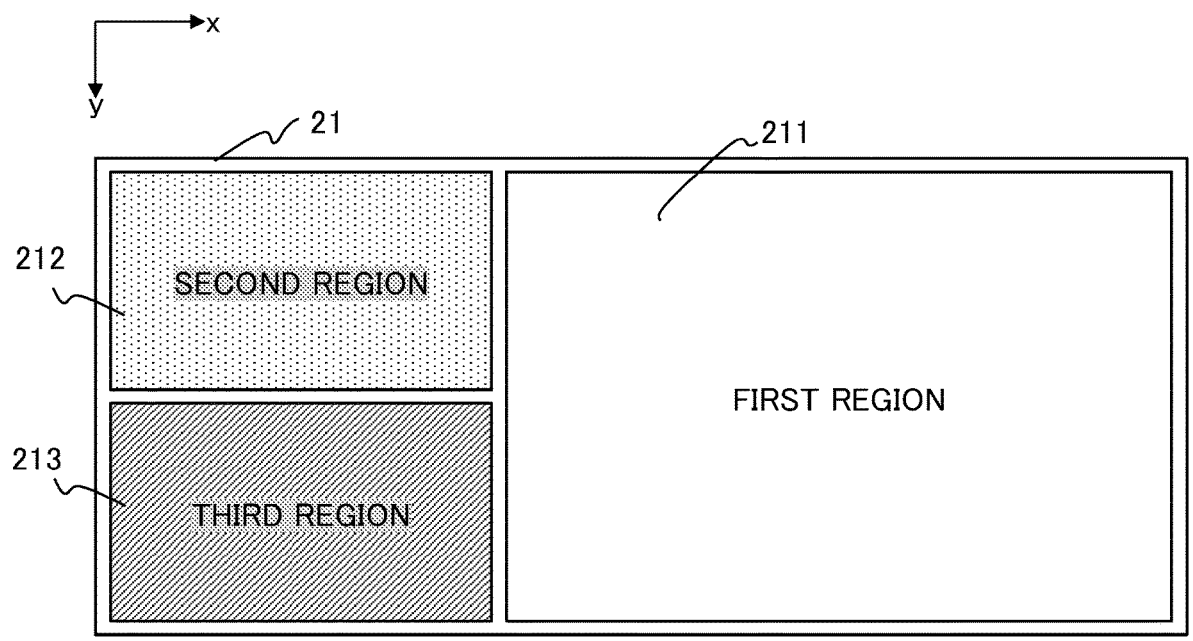
FIG. 3 is a diagram for defining a plurality of divided regions in a first display.

FIG. 3 illustrates, as the first operation example, a case in which the display screen of the first display 21 is divided into three divided regions. As illustrated in the figure, the largest divided region is hereinafter referred to as a first region 211, and the other two divided regions are hereinafter respectively referred to as a second region 212 and a third region 213. As a coordinate system of the first display 21, the long side is defined as an x-axis direction and the short side is defined as a y-axis direction, with the upper left being the origin. Note that the number into which the display screen of the first display 21 is divided is not limited to 3, and may be 4 or more.

In each divided region of the first region 211, the second region 212, and the third region 213, for example, the navigation screen related to the navigation function, the air conditioning screen for setting a temperature, an air flow rate, and the like of an air conditioner, an audio screen for selecting music of audio and setting volume and the like, the application (App) screen of an application to be executed by a wirelessly connected smartphone, a phone screen for outgoing and incoming phone calls, and the like can be assigned and displayed.

Note that, regarding the display in each divided region, the display information generation unit 124 is configured to change the contents of information to be displayed according to the size of each divided region. For example, the display information generation unit 124 is configured to, in a case that a screen for the route guidance is assigned to the first region 211, display only information of the next intersection to make a turn or the like when the size of the screen is small, and display a map of a wider area when the size of the screen is large. Further, the display information generation unit 124 is configured to, for example, in a case that the air conditioner screen is assigned in the second region 212, display only the current temperature when the size of the air conditioner screen is small, and additionally display an operation reception button for changing set temperature as well when the size of the air conditioner screen is large.

Figure 5:
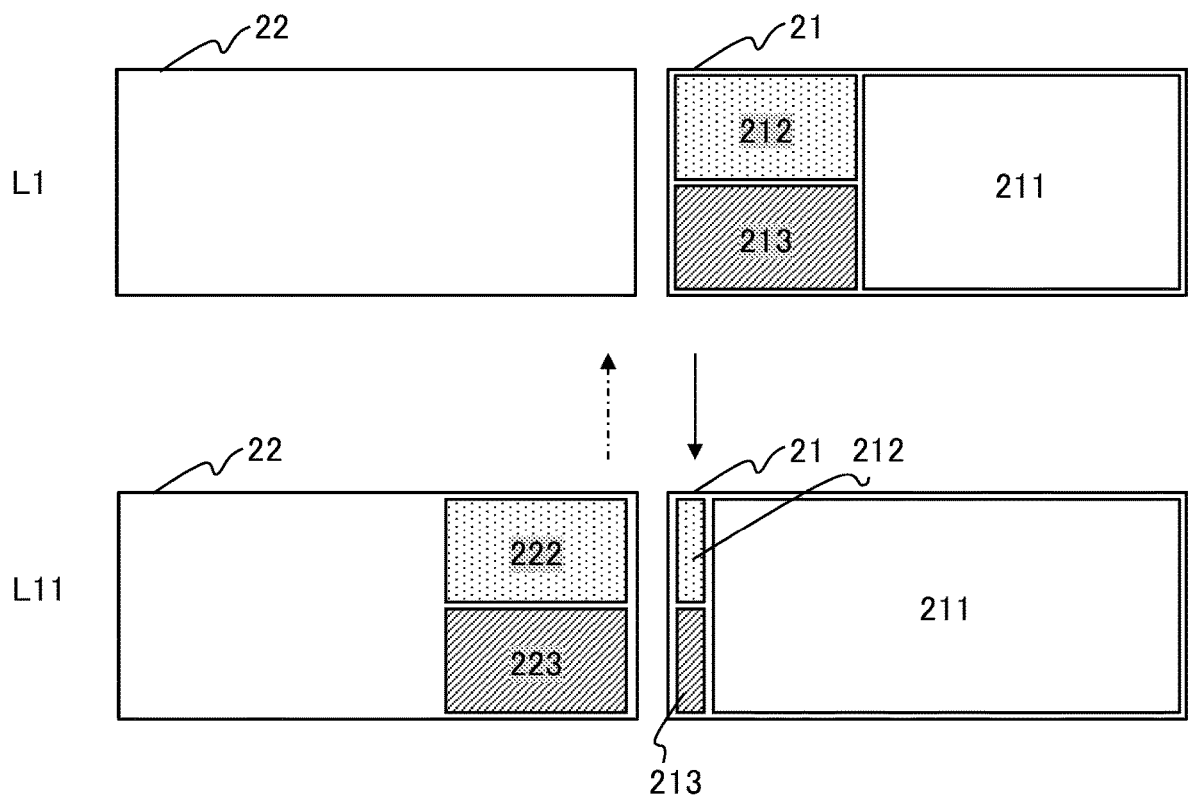
FIG. 5 is a diagram illustrating display examples of a layout L11 also using a second display.
Figure 6:
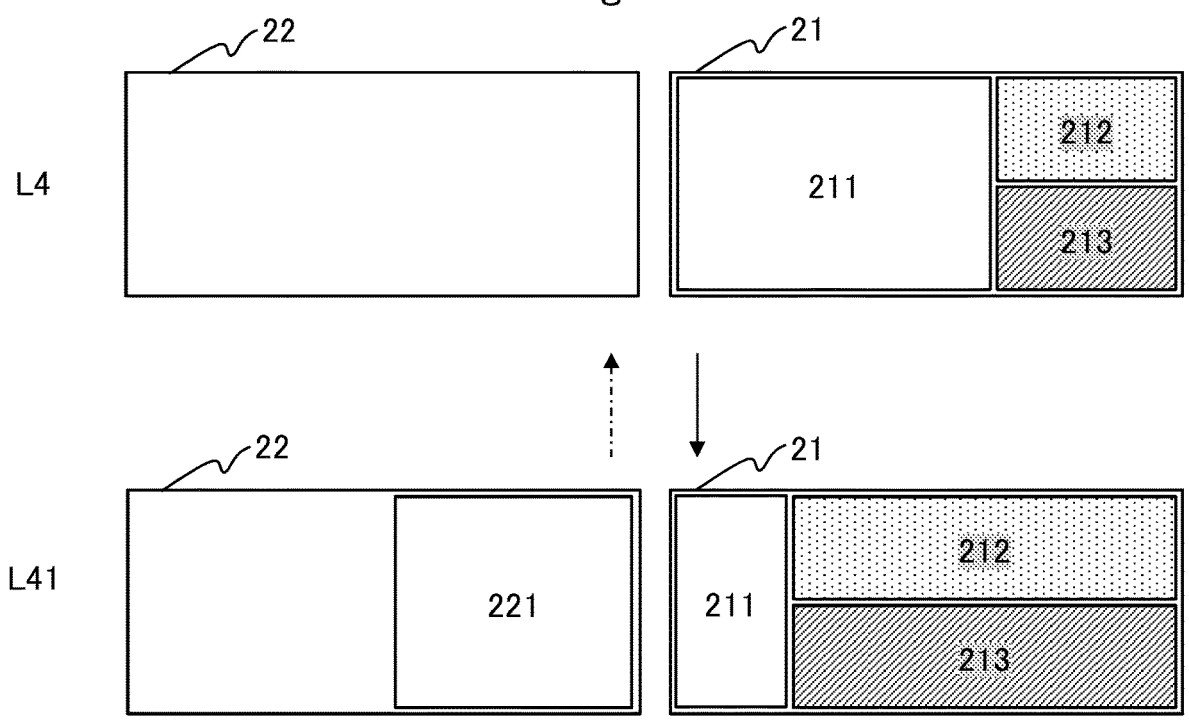
FIG. 6 is a diagram illustrating display examples of a layout L41 also using the second display.

The sizes and the positional relationship of the first region 211, the second region 212, and the third region 213 can be changed by the user selecting any one of layouts L1 to L6 (FIG. 4), L11 (FIG. 5), and L41 (FIG. 6).

Specifically, when the user performs touch-on and drag on the first display 21 (touch panel 251 stacked thereon), the operation detection unit 122 detects the touch operation and notifies the layout setting unit 123 of detection results. The layout setting unit 123 transitions the layout in the display screen according to the detection results of the touch operation.

Note that the directions of the transition of respective layouts are not arbitrary but are limited. For example, transition can be performed only to the layout L2, L6, or L11 in the layout L1, and for example, transition can be performed only to the layout L1 or L3 in the layout L2. In this manner, transition can be performed only between specific layouts. Limiting the transition of the layouts enables processing of the layout setting unit 123 to be reduced.

Figure 4:
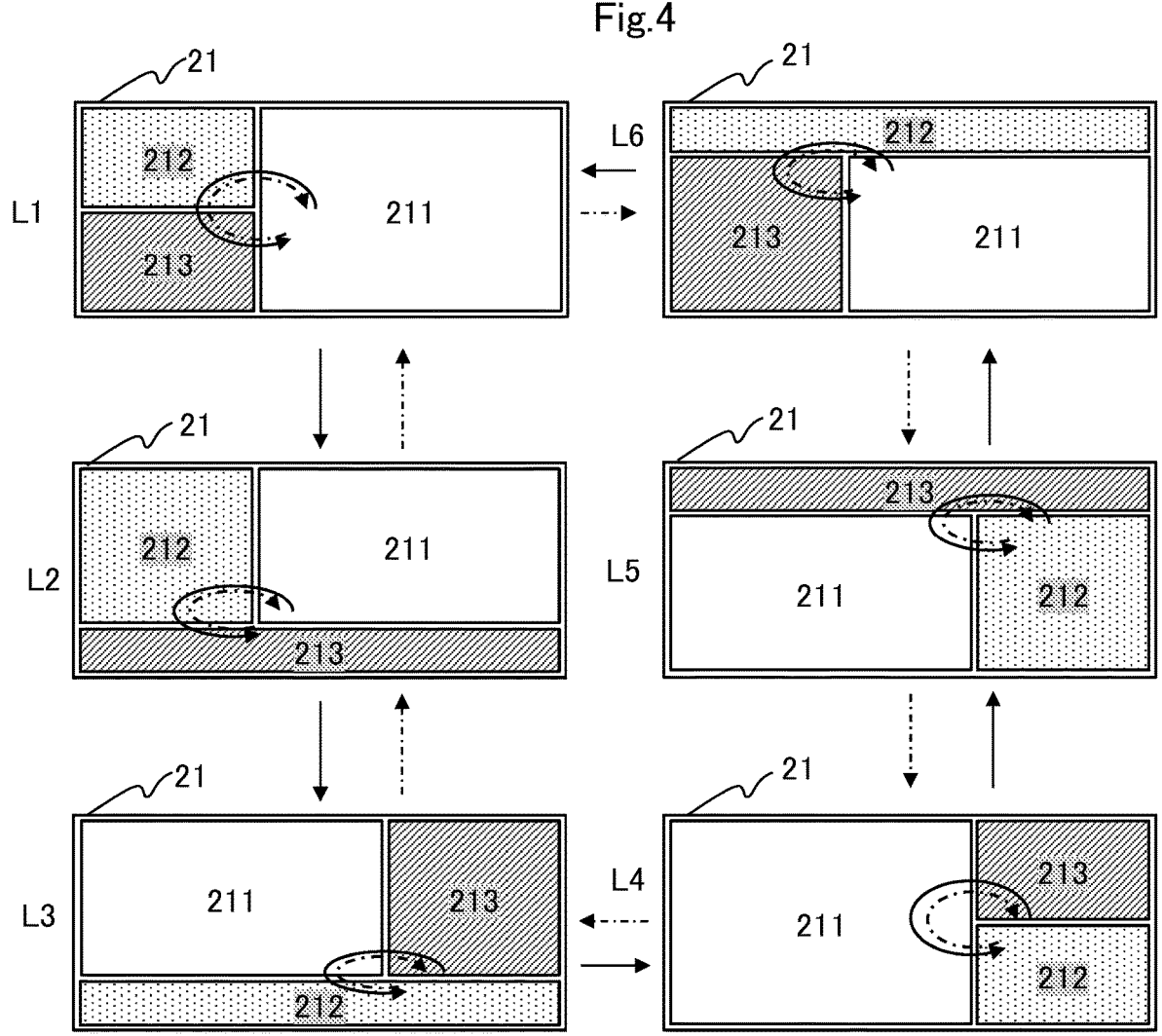
FIG. 4 is a diagram illustrating display examples of layouts L1 to L6 in the first display.

Next, FIG. 4 illustrates display examples of the layouts L1 to L6 using only the first display 21.

In the layout L1 illustrated at the upper left part of the figure, the first region 211 occupies the right side of the display screen. The second region 212 and the third region 213 have the same size, are aligned in the vertical direction, and occupy the left side of the display screen.

In the layout L2 illustrated in the left middle part of the figure, as compared to the layout L1, the first region 211 has its width in the vertical direction being reduced from the lower side. The second region 212 has its width in the vertical direction being extended to the lower side so as to have the same length as the first region 211. The third region 213 has its width in the vertical direction being reduced, and its width in the horizontal direction being extended to the right end of the display screen.

In the layout L3 illustrated in the lower left part of the figure, as compared to the layout L2, the first region 211 is moved to the left side with its size remaining the same. The second region 212 has its size and position being changed, and occupies the same position as the third region 213 in the layout L2. The third region 213 has its width in the horizontal direction being reduced from the left side and being extended in the vertical axis direction and is moved to the upper end of the display screen, in a manner of occupying the region rendered vacant due to the first region 211 moving to the left side.

In the layout L4 illustrated in the lower right part of the figure, the first region 211 has its width in the vertical direction being extended to the lower end of the display screen, and occupies the left side of the display screen. The second region 212 and the third region 213 are deformed to have the same size, are aligned in the vertical direction, and occupy the right side of the display screen.

In the layout L5 illustrated in the right middle part of the figure, as compared to the layout L4, the first region 211 has its width in the vertical direction being reduced from the upper side. The second region 212 has its width in the vertical direction being extended to the upper side so as to have the same length as the first region 211. The third region 213 has its width in the vertical axis direction being reduced, and its width in the horizontal direction being extended to the left end of the display screen.

In the layout L6 illustrated in the upper right part of the figure, as compared to the layout L5, the first region 211 is moved to the right side with its size remaining the same. The second region 212 has its size and position being changed, and occupies the same position as the third region 213 in the layout L5. The third region 213 has its width in the horizontal direction being reduced from the right side and being extended in the vertical direction and is moved to the lower end of the display screen, in a manner of occupying the region rendered vacant due to the first region 211 moving to the right side.

Next, the transition between the layouts according to the first operation example will be described.

In the layout L1, according to a predetermined touch operation (details of which will be described later) from the user, the display can transition to the layout L2 as if the divided regions rotate in the counterclockwise direction in the display screen. According to a predetermined touch operation from the user, the display can transition to the layout L6 as if the divided regions rotate in the clockwise direction in the display screen.

In the layout L2, according to a predetermined touch operation from the user, the display can transition to the layout L3 as if the divided regions rotate in the counterclockwise direction in the display screen. According to a predetermined touch operation from the user, the display can transition to the layout L1 as if the divided regions rotate in the clockwise direction in the display screen.

In the layout L3, according to a predetermined touch operation from the user, the display can transition to the layout L4 as if the divided regions rotate in the counterclockwise direction in the display screen. According to a predetermined touch operation from the user, the display can transition to the layout L2 as if the divided regions rotate in the clockwise direction in the display screen.

In the layout L4, according to a predetermined touch operation from the user, the display can transition to the layout L5 as if the divided regions rotate in the counterclockwise direction in the display screen. According to a predetermined touch operation from the user, each divided region can be transitioned to the layout L3 in the display screen as if the divided region rotates in the clockwise direction.

In the layout L5, according to a predetermined touch operation from the user, the display can transition to the layout L6 as if the divided regions rotate in the counterclockwise direction in the display screen. According to a predetermined touch operation from the user, each divided region can be transitioned to the layout L4 in the display screen as if the divided region rotates in the clockwise direction.

In the layout L6, according to a predetermined touch operation from the user, the display can transition to the layout L1 as if the divided regions rotate in the counterclockwise direction in the display screen. According to a predetermined touch operation from the user, each divided region can be transitioned to the layout L5 in the display screen as if the divided region rotates in the clockwise direction.

Note that, in the layout L1, transition to the layout L11 also using the second display 22 can be performed in addition to transitions to the layouts L2 and L6 described above.

FIG. 5 illustrates display examples of the layout L11 using both of the first display 21 and the second display 22.

In the layout L11 illustrated in the lower side of the figure, the first region 211 occupies the most part of the first display 21, and the second region 212 and the third region 213 are aligned and displayed in the vertical direction at the left end of the first display 21 with their horizontal widths being extremely short. In the second display 22, a second region 222 and a third region 223, which respectively correspond to the second region 212 and the third region 213 of the first display 21 in the layout L1, are displayed.

In the layout L1 illustrated on the upper side of the figure, according to a predetermined touch operation on the first display 21 (touch panel 251 stacked thereon) from the user, display of the first display 21 and the second display 22 can be transitioned to the layout L11 as if the second region 212 and the third region 213 are pushed out to second display 22 on the left side by the first region 211.

In the layout L11 illustrated in the lower side of the figure, according to a predetermined touch operation on the first display 21 (touch panel 251 stacked thereon) from the user, display of the first display 21 and the second display 22 can be transitioned to the layout L1 as if the second region 222 and the third region 223 displayed in the second display 22 are brought back to the first display 21 on the right side.

In the layout L4, transition to the layout L41 also using the second display 22 can be performed in addition to transitions to the layouts L3 and L5 described above.

FIG. 6 illustrates display examples of the layout L41 using both of the first display 21 and the second display 22.

In the layout L41 illustrated on the lower side of the figure, the second region 212 and the third region 213, which are aligned in the vertical direction, occupy the most part of the right side of the display screen of the first display 21. At the left end of the display screen of the first display 21, the first region 211, which occupies the entire width in the vertical direction and has a short horizontal width, is displayed. In the second display 22, a first region 221, which corresponds to the first region 211 of the first display 21 in the layout L4, is displayed.

In the layout L4 illustrated on the upper side of the figure, according to a predetermined touch operation on the first display 21 (touch panel 251 stacked thereon) from the user, display of the first display 21 and the second display 22 can be transitioned to the layout L41 as if the first region 211 is pushed out to the second display 22 on the left side from the second region 212 and the third region 213.

In the layout L41 illustrated on the lower side of the figure, according to a predetermined touch operation on the first display 21 (touch panel 251 stacked thereon) from the user, display of the first display 21 and the second display 22 can be transitioned to the layout L4 as if the first region 221 displayed in the second display 22 is brought back to the first display 21.

Incidentally, the transition process between the layouts described above is displayed at least in the first display 21 as an animation in which the sizes, the shapes (rectangular aspect ratios), and the positional relationship of respective divided regions are gradually changed.

Figure 7:
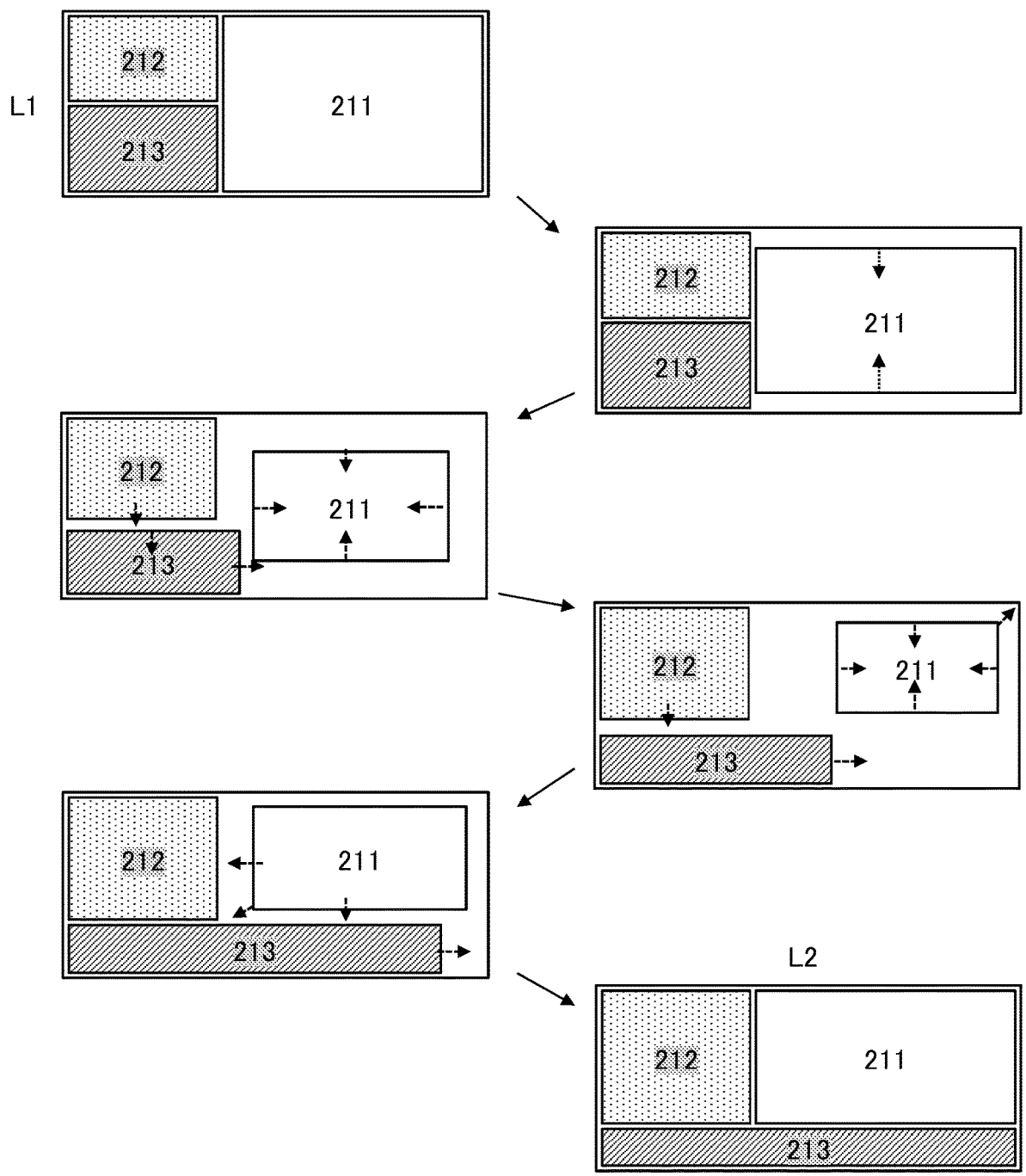
FIG. 7 is a diagram illustrating display an example of an animation presenting a process of transition from the layout L1 to L2.

FIG. 7 illustrates display an example of an animation presenting a transition process from the layout L1 to the layout L2.

As illustrated in the figure, in the transition process between the layouts, according to the distance of the drag performed by the user, the divided regions are moved to be arranged in the layout of the transition target while changing their sizes, shapes, and display positions as if the divided regions repel each other without the divided regions coming into contact with each other or overlapping with each other. Note that, while the size, the shape, and the display position of each divided region are changed, the information display in each divided region is continued by the display information generation unit 124, with the scale of each divided region being increased and/or reduced in accordance with the change of the size of each region.

When the touch operation of the user ends before the transition of the layouts is completed (when the user performs touch-off), the transition is determined depending on the distance of the drag, in other words, the distance from the touch-on coordinates to the touch-off coordinates. For example, when the distance of the drag is less than a predetermined length (for example, 50% of the horizontal width of the first display 21), the layout is brought back to the layout before the transition, whereas when the distance of the drag is equal to or more than the predetermined length, the transition is advanced to the layout of the transition target.

<Layout Transition Processing According to First Operation Example>

Figure 8:
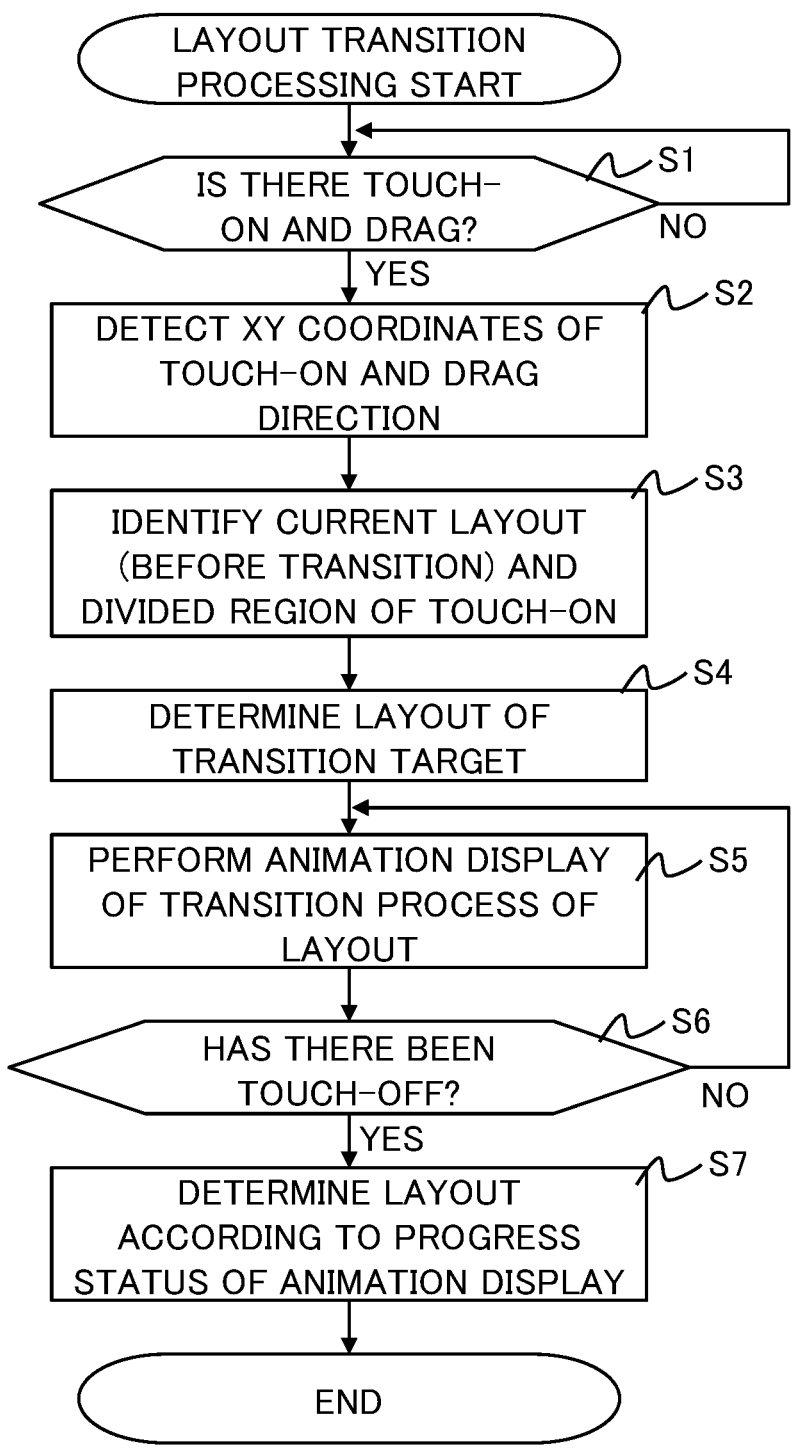
FIG. 8 is a flowchart illustrating an example of layout transition processing according to a first operation example.

Next, FIG. 8 is a flowchart illustrating an example of layout transition processing according to the first operation example.

The layout transition processing is, for example, started after an ignition switch of a vehicle is turned on, the onboard device 10 is started, and predetermined information is displayed in each divided region provided in the display screen of the first display 21. The layout transition processing is, for example, repeatedly executed until the ignition switch of the vehicle is then turned off and operation of the onboard device 10 ends.

First of all, the operation detection unit 122 starts to monitor touch operation on the touch panel 251 that is stacked on the first display 21, and determines whether or not there is touch-on and drag from the user (Step S1). Here, when the operation detection unit 122 determines that there is no touch-on and drag (NO in Step S1), the operation detection unit 122 continues to monitor the touch operation on the touch panel 251.

In contrast, when the operation detection unit 122 determines that there is touch-on and drag of a predetermined amount or more (YES in Step S1), the operation detection unit 122 detects xy coordinates on which the touch-on is performed and a drag direction and notifies the layout setting unit 123 of the xy coordinates and the drag direction (Step S2). Note that the drag direction may be detected as a rightward direction (+x-axis direction) or a leftward direction (−x-axis direction). For example, when the user drags in an oblique direction, its y-axis direction component may be ignored and only an x-axis direction component may be detected.

When an operation reception button is displayed in the display screen at the position where the touch-on is performed, operation on the operation reception button performed by the user may be prioritized, and the transition of the layouts is not executed. This can prevent transition of the layouts unintended by the user when the user performs touch operation not with the intention of transitioning the layouts.

Next, the layout setting unit 123 refers to the layout information 132 in the storage unit 130 and identifies the current layout (before transition) and the divided region currently displayed at the xy coordinates where the touch-on is performed (Step S3). Next, the layout setting unit 123 refers to the transition table 133 in the storage unit 130 and determines the layout of the transition target, based on the layout before transition, the divided region at which the touch-on is performed, whether the y coordinates at which the touch-on is performed are located on the upper side (the upper half) or the lower side (the lower half) of the first display 21 in the vertical direction, and the drag direction (Step S4).

Note that, in the present embodiment, the transition table 133 is used as a determination condition for determining the layout of the transition target. However, the determination condition for determining the layout of the transition target is not limited thereto. As long as the touch operation and the layout of the transition target are associated with each other in advance and can be used as the determination condition, there is no limitation on how the information is arranged.

Here, the transition table 133 will be described. FIG. 9A to FIG. 9B illustrates an example of the transition table 133 corresponding to the first operation example. The transition table 133 is information (transition information) for determining the layout of the transition target. The transition table 133 records the layout before transition, the touch operation, and the layout of the transition target in association with each other.

For example, when the layout before transition is L1 and touch-on on the third region 213 and drag in the rightward direction are detected, the layout setting unit 123 determines the layout of the transition target as L2. Further, for example, when the layout before transition is L1 and touch-on on the second region 212 and drag in the rightward direction are detected, the layout setting unit 123 determines the layout of the transition target as L6. In addition, for example, when the layout before transition is L1 and touch-on on the upper side of the first region 211 in the vertical direction and drag in the leftward direction are detected, the layout setting unit 123 determines the layout of the transition target as L2. In addition, for example, when the layout before transition is L1 and touch-on on the lower side of the first region 211 in the vertical direction and drag in the leftward direction are detected, the layout setting unit 123 determines the layout of the transition target as L6.

Further, for example, when the layout before transition is L1 and touch-on on the second region 212 or the third region 213 and drag in the leftward direction are detected, the layout setting unit 123 determines the layout of the transition target as L11.

In addition, for example, when the layout before transition is L4 and touch-on on the first region 211 and drag in the leftward direction are detected, the layout setting unit 123 determines the layout of the transition target as L41.

Note that, for example, when the layout before transition is L4 and touch-on on the second region 212 or the third region 213 and drag in the rightward direction are detected, the layout setting unit 123 does not determine the layout of the transition target. In this case, in the animation display in Step S5 to be described later, the following behavior is displayed: according to the drag operation, the second region 212 and the third region 213 are slightly moved in the rightward direction but are then immediately moved back to the original layout L4.

FIG. 8 is referred to again. As described above, after the layout setting unit 123 determines the layout of the transition target, the layout setting unit 123 subsequently refers to the animation information 134 in the storage unit 130 and displays an animation presenting the transition process from the layout before transition to the layout of the transition target at least in the first display 21 (Step S5).

Next, the operation detection unit 122 determines whether or not the user has performed touch-off (whether or not the user is still performing the drag) (Step S6). Here, when the operation detection unit 122 determines that the user has not performed touch-off (NO in Step S6), the processing is brought back to Step S5. Then, with the repetition of the processing of Steps S5 and S6, the animation display performed by the layout setting unit 123 is continued.

Subsequently, when the operation detection unit 122 determines that the user has performed touch-off (YES in Step S6), the operation detection unit 122 notifies the layout setting unit 123 of touch-off coordinates. Next, the layout setting unit 123 determines the layout according to the distance of the drag. (Step S7). Specifically, when the distance of the drag is less than a predetermined length, the layout setting unit 123 brings the layout back to the layout before transition, whereas when the distance of the drag is equal to or more than the predetermined length (including a case in which the animation display has already finished), the layout setting unit 123 determines the layout as the state of the transition target. After the above process, the layout transition processing according to the first operation example ends.

According to the layout transition processing according to the first operation example described above, the user can transition the layouts of the screen display in the first display 21 by touching any position on the first display 21 (touch panel 251 stacked thereon) and dragging from the position. Depending on a layout, both of the first display 21 and the second display 22 can be used. The onboard device 10 can display the transition process as an animation when the layouts are transitioned.

Second Operation Example

Next, a second operation example will be described. As the second operation example, the onboard device 10 can divide the display screen of the first display 21 into a plurality of divided regions, and display different pieces of information in each divided region. In addition, the onboard device 10 can change the sizes and the positional relationship of the plurality of divided regions according to the touch operation from the user on a pointer 301 (FIG. 10) displayed in the first display 21.

In addition, the onboard device 10 can move the divided region to the second display 22 to display the divided region in the second display 22 according to the touch operation from the user on the first display 21.

Figure 10:
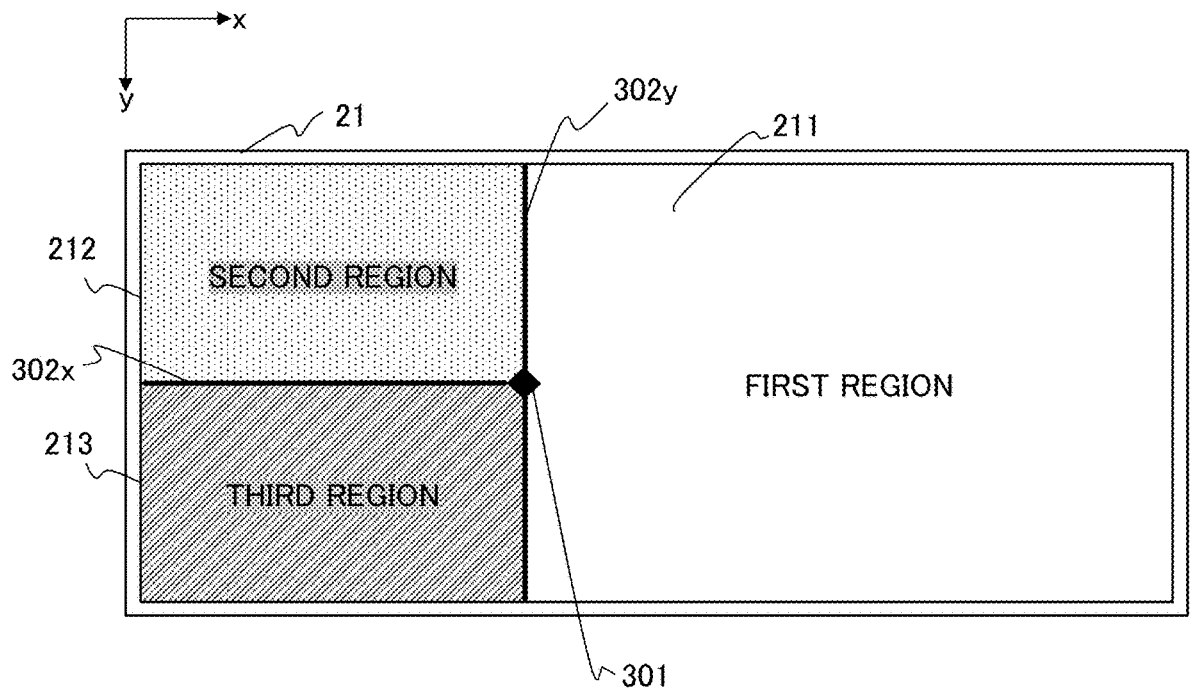
FIG. 10 is a diagram for defining a plurality of divided regions, division lines, and a pointer in the first display.
Figure 11:
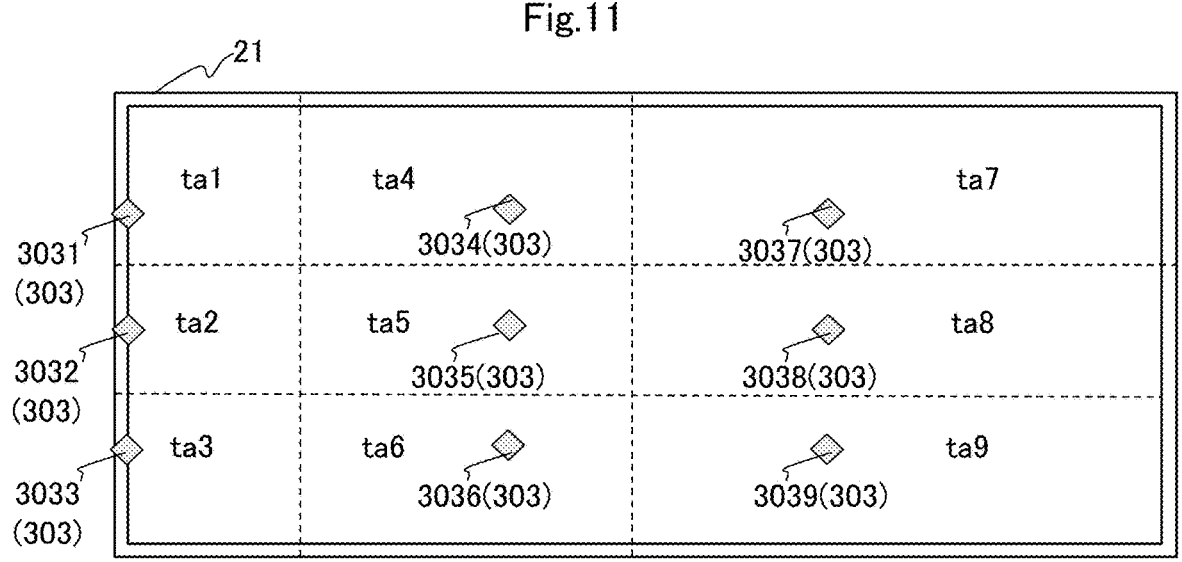
FIG. 11 is a diagram illustrating an example of detection regions and pointer change points in the first display.

FIG. 10 illustrates, as the second operation example, a case in which the display screen of the first display 21 is divided into three divided regions. As illustrated in the figure, the largest divided region is hereinafter referred to as a first region 211, and the other two divided regions are hereinafter referred to as a second region 212 and a third region 213. In the coordinate system of the first display 21, the long side is defined as the x-axis direction and the short side is defined as the y-axis direction, with the upper left being the origin. Note that the number into which the display screen of the first display 21 is divided is not limited to 3, and may be 4 or more.

In the second operation example, unlike the first operation example, division lines 302 (302x, 302y) are displayed at the boundaries between the divided regions in the display screen of the first display 21. The pointer 301 is displayed at the intersection of the division lines 302.

The user can transition the display among the layouts having different sizes and positional relationships of each divided region by touching and dragging the pointer 301 and moving the pointer 301 to a position near any one of a plurality of pointer movement points 303 that are set in advance.

FIG. 11 illustrates an example of the plurality of pointer movement points 303 set in advance in the first display 21 (touch panel 251 stacked thereon) and touch regions ta set around the plurality of pointer movement points 303. In the case illustrated in the figure, in the first display 21, nine pointer movement points 3031 to 3039 are set, and touch regions ta1 to ta9 are respectively provided around the nine pointer movement points 3031 to 3039.

Note that the pointer movement points 303 and the boundaries between the touch regions ta are not displayed in the first display 21. Thus, the user first performs touch-on on the pointer 301 being displayed, and then intuitively drags the pointer 301 in any of the upward, downward, rightward, and leftward directions. Thus, when the user touches and drags the pointer 301, the operation detection unit 122 refers to the pointer information 135 in the storage unit 130, determines the touch region ta to which the dragged xy coordinates belong, and considers that the pointer 301 has moved to the pointer movement point 303 belonging to the touch region ta. For example, when the user touches the pointer 301 located at the pointer movement point 3035 and drags the pointer 301 in the rightward direction to reach the touch region ta8, the operation detection unit 122 considers that the pointer 301 has moved to the pointer movement point 3038.

In the second operation example as well, in each divided region of the first region 211, the second region 212, and the third region 213, for example, the navigation screen, the air conditioner screen, the audio screen, the application (App) screen, the phone screen, and the like can be assigned and displayed.

Note that, regarding each divided region, the display information generation unit 124 is configured to change the contents of information to be displayed according to the size of each divided region. For example, in a case that the air conditioner screen is assigned in the second region 212, only the current temperature is displayed when the size of the air conditioner screen is small, and an operation reception button for changing set temperatures is additionally displayed when the size of the air conditioner screen is large.

In the second operation example, regarding the positional relationship and the sizes of the first region 211, the second region 212, and the third region 213, the user can select any one of layouts L101 to L104 (FIG. 12) and the selected one can be displayed.

Specifically, when the user performs touch-on and drag on the pointer 301 of the first display 21, the operation detection unit 122 detects the touch operation and notifies the layout setting unit 123 of detection results. The layout setting unit 123 transitions the layout according to the detection results of the touch operation.

Note that the directions of the transition of respective layouts are not arbitrary but are limited. For example, transition can be performed only to the layout L102 or L104 in the layout L101, and for example, transition can be performed only to the layout L103 in the layout L102. In this manner, transition can be performed only between specific layouts. Limiting the transition of the layouts enables processing of the layout setting unit 123 to be reduced.

Figure 12:
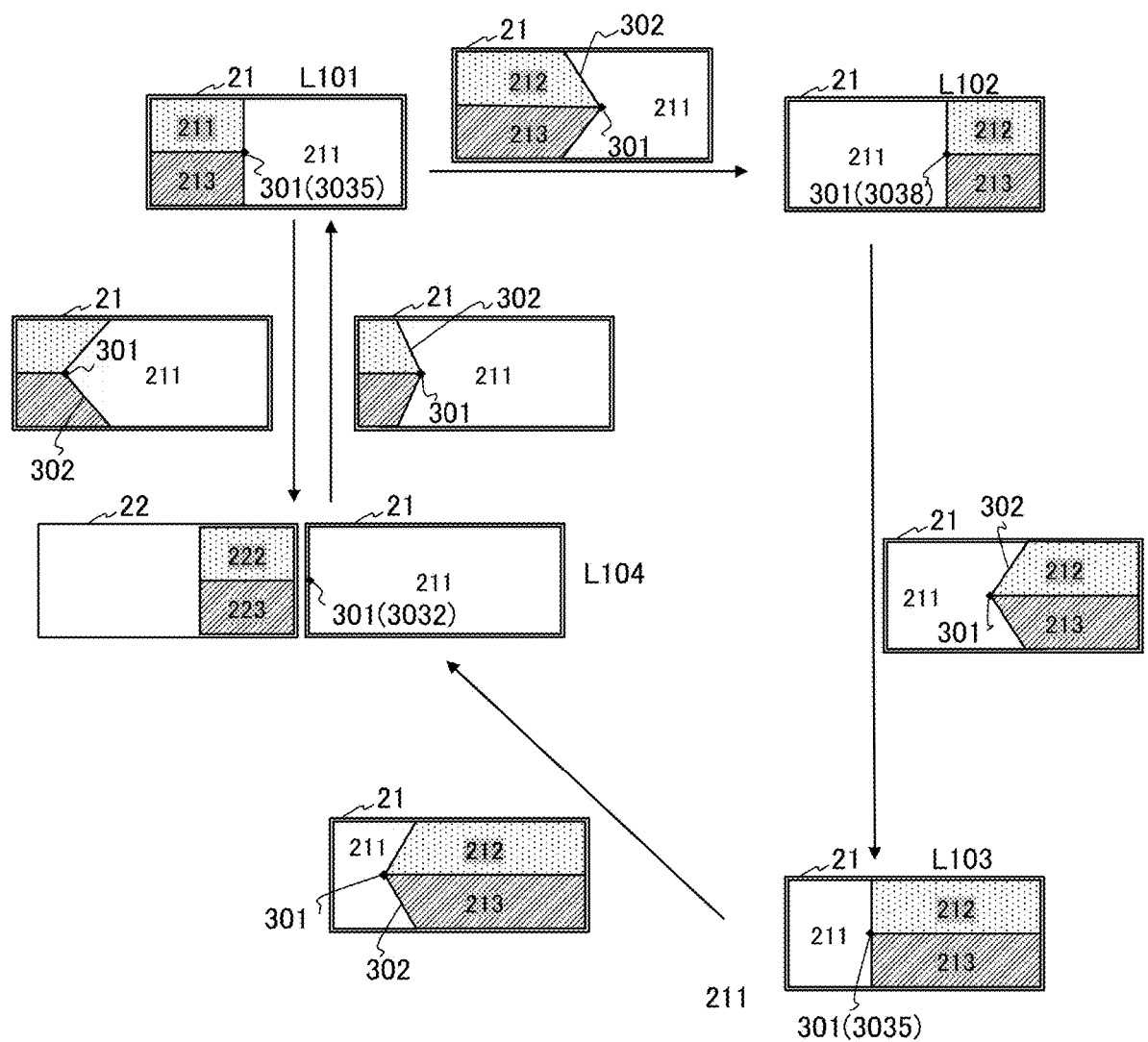
FIG. 12 is a diagram illustrating an example of layouts L101 to L104 using both of the first display and the second display.

Next, FIG. 12 illustrates display examples of the layouts L101 to L104 according to the second operation example. Note that, in the layouts L101 to L103, only the first display 21 is used. In the layout L104, both of the first display 21 and the second display 22 are used.

In the layout L101 illustrated in the upper left part of the figure, the first region 211 occupies the right side of the display screen. The second region 212 and the third region 213 have the same size, are aligned in the vertical direction, and occupy the left side of the display screen. In this case, the pointer 301 is located at the pointer movement point 3035.

In the layout L102 illustrated in the upper right part of the figure, the first region 211 occupies the left side of the display screen. The second region 212 and the third region 213 have the same size, are aligned in the vertical direction, and occupy the right side of the display screen. In this case, the pointer 301 is located at the pointer movement point 3038.

In the layout L103 illustrated in the lower right part of the figure, the first region 211 has its horizontal width being reduced to have the same horizontal width as the second region 212 and the third region 213 in the layout L101, and occupies the left side of the display screen. The second region 212 and the third region 213 are extended to have the same horizontal width as the first region 211 in the layout L101, and occupy the right side of the display screen. In this case, the pointer 301 is located at the pointer movement point 3035.

In the layout L104 illustrated in the left middle part of the figure, the first region 211 occupies the entire display screen of the first display 21. In the second display 22, a second region 222 and a third region 223, which respectively correspond to the second region 212 and the third region 213 in the layout L101, have the same size, are aligned in the vertical direction, and occupy the right side of the display screen. In this case, the pointer 301 is located at the pointer movement point 3032.

Next, the transition between the layouts according to the second operation example will be described.

In the layout L101, according to touch-on on the pointer 301 and drag in the rightward direction performed by the user, display of the first display 21 can be transitioned to the layout L102. When the drag operation is performed, the following process is displayed: the division lines 302 are deformed as if the division lines 302 are stretched like an elastic object, such as a rubber band, that is connected to the pointer 301, and the shape of each divided region is also deformed into a trapezoidal shape along with the deformation of the division lines 302. Specifically, the division line 302 in parallel with the x-axis direction is stretched in the rightward direction, and the division line 302 in parallel with the y-axis direction is bent at the position of the pointer 302 and is stretched in oblique directions. Then, when the user performs touch-off in the touch region ta8, the pointer 301 is instantaneously moved as if the pointer 301 is pulled to the pointer movement point 3038, with the result that the transition to the layout L102 is completed. In contrast, when the user performs touch-off in the touch region ta5, the pointer 301 is instantaneously brought back to the pointer movement point 3035 as if the pointer 301 is pulled, with the result that the transition of the layout is canceled.

In the layout L101, according to touch-on on the pointer 301 and drag in the leftward direction performed by the user, display in the first display 21 and the second display 22 can be transitioned to the layout L104. When the drag operation is performed, in a manner similar to the case described above, the process of the deformation of the division lines 302 and the deformation of each divided region along with the deformation of the division lines is displayed. Then, when the user performs touch-off in the touch region ta2, the pointer 301 is instantaneously moved to the pointer movement point 3032 as if the pointer 301 is pulled, with the result that the transition to the layout L104 is completed. In contrast, when the user performs touch-off in the touch region ta5, the pointer 301 is instantaneously moved to the pointer movement point 3035 as if the pointer 301 is pulled, with the result that the transition of the layout is canceled.

In the layout L102, according to touch-on on the pointer 301 and drag in the leftward direction performed by the user, display in the first display 21 can be transitioned to the layout L103. When the drag operation is performed, in a manner similar to the case described above, the process of the deformation of the division lines 302 and the deformation of each divided region along with the deformation of the division lines is displayed. Then, when the user performs touch-off in the touch region ta5, the pointer 301 is instantaneously moved to the pointer movement point 3035 as if the pointer 301 is pulled, with the result that the transition to the layout L103 is completed. In contrast, when the user performs touch-off in the touch region ta8, the pointer 301 is instantaneously brought back to the pointer movement point 3038 as if the pointer 301 is pulled, with the result that the transition of the layout is canceled.

In the layout L103, according to touch-on on the pointer 301 and drag in the leftward direction performed by the user, display in the first display 21 and the second display 22 can be transitioned to the layout L104. When the drag operation is performed, in a manner similar to the case described above, the process of the deformation of the division lines 302 and the deformation of each divided region along with the deformation of the division lines is displayed. Then, when the user performs touch-off in the touch region ta2, the pointer 301 is instantaneously moved to the pointer movement point 3032 as if the pointer 301 is pulled, with the result that the transition to the layout L104 is completed. In contrast, when the user performs touch-off in the touch region ta5, the pointer 301 is instantaneously brought back to the pointer movement point 3035 as if the pointer 301 is pulled, with the result that the transition of the layout is canceled.

In the layout L104, according to touch-on on the pointer 301 and drag in the rightward direction performed by the user, display in the first display 21 can be transitioned to the layout L101. When the drag operation is performed, in a manner similar to the case described above, the process of the deformation of the division lines 302 and the deformation of the shape of each divided region along with the deformation of the division lines is displayed. Then, when the user performs touch-off in the touch region ta5, the pointer 301 is instantaneously moved to the pointer movement point 3035 as if the pointer 301 is pulled, with the result that the transition to the layout L101 is completed. In contrast, when the user performs touch-off in the touch region ta2, the pointer 301 is instantaneously brought back to the pointer movement point 3032 as if the pointer 301 is pulled, with the result that the transition of the layout is canceled.

Figure 13:
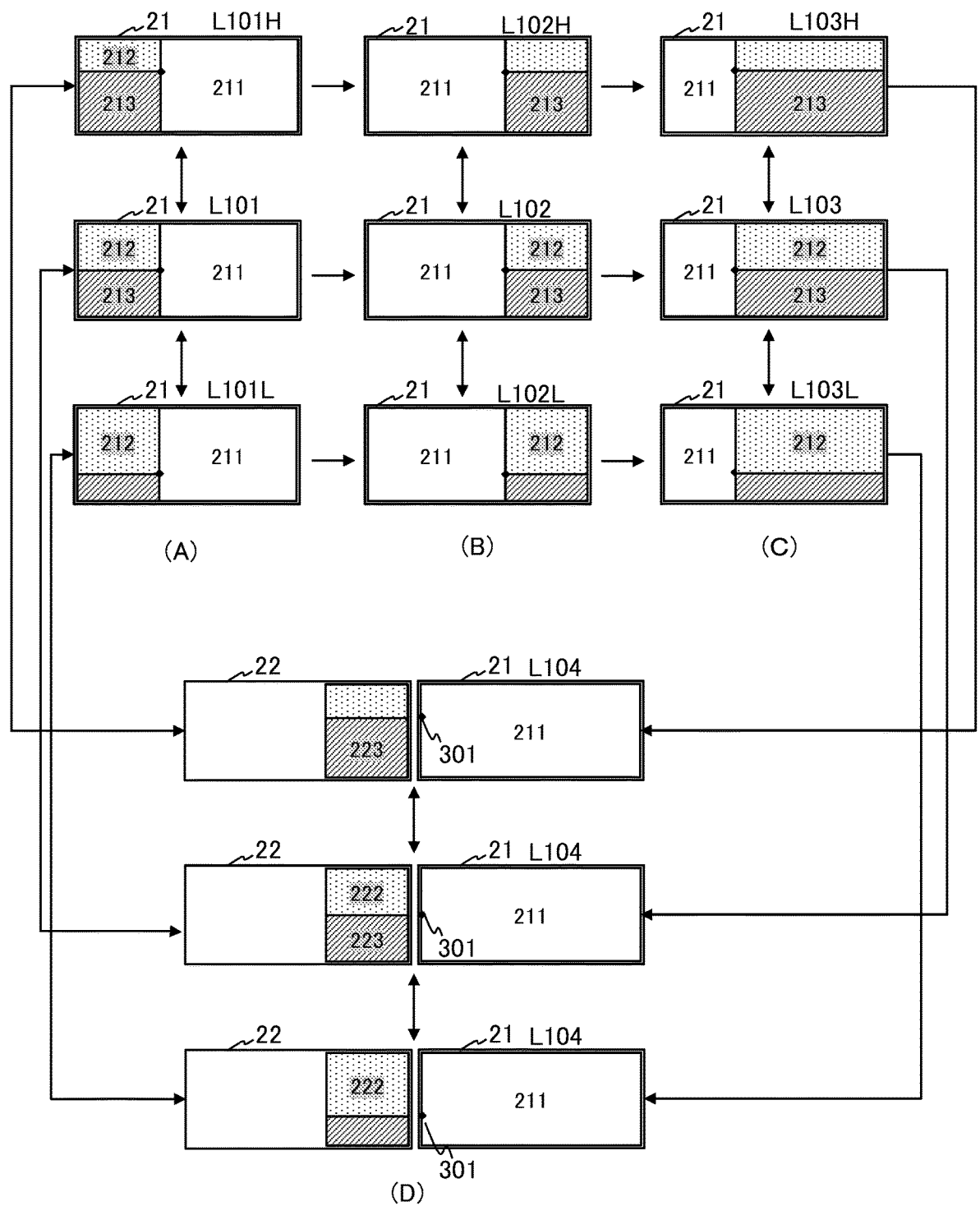
FIG. 13 is a diagram illustrating modifications of each of the layouts L101 to L104.

Next, FIG. 13 illustrates modifications of each of the layouts L101 to L104.

(A) in the figure is a modification of the layout L101, and illustrates a layout L101H in the upper part, the layout L101 in the middle part, and a layout L101L in the lower part. In the layout L101H, as compared to the layout L101, the second region 212 has its width in the vertical direction being reduced, and the third region 213 has its width in the vertical direction being extended by the reduced amount. In this case, the pointer 301 is located at the pointer movement point 3034. The layout L101H and the layout L101 can be mutually transitioned from one another. In the layout L101L, as compared to the layout L101, the second region 212 has its width in the vertical direction being extended, and the third region 213 has its width in the vertical direction being reduced by the extended amount. In this case, the pointer 301 is located at the pointer movement point 3036. The layout L101L and the layout L101 can be mutually transitioned from one another.

(B) in the figure is a modification of the layout L102, and illustrates a layout L102H in the upper part, the layout L102 in the middle part, and a layout L102L in the lower part. In the layout L102H, as compared to the layout L102, the second region 212 has its width in the vertical direction being reduced, and the third region 213 has its width in the vertical direction being extended by the reduced amount. In this case, the pointer 301 is located at the pointer movement point 3037. The layout L102H and the layout L102 can be mutually transitioned from one another. In the layout L102L, as compared to the layout L102, the second region 212 has its width in the vertical direction being extended, and the third region 213 has its width in the vertical direction being reduced by the extended amount. In this case, the pointer 301 is located at the pointer movement point 3039. The layout L102L and the layout L102 can be mutually transitioned from one another.

(C) in the figure is a modification of the layout L103, and illustrates a layout L103H in the upper part, the layout L103 in the middle part, and a layout L103L in the lower part. In the layout L103H, as compared to the layout L103, the second region 212 has its width in the vertical direction being reduced, and the third region 213 has its width in the vertical direction being extended by the reduced amount. In this case, the pointer 301 is located at the pointer movement point 3034. The layout L103H and the layout L103 can be mutually transitioned from one another. In the layout L103L, as compared to the layout L103, the second region 212 has its width in the vertical direction being extended, and the third region 213 has its width in the vertical direction being reduced by the extended amount. In this case, the pointer 301 is located at the pointer movement point 3036. The layout L103L and the layout L103 can be mutually transitioned from one another.

(D) in the figure is a modification of the layout L104, and illustrates a layout L104H in the upper part, the layout L104 in the middle part, and a layout L104L in the lower part. In the layout L104H, as compared to the layout L104, the second region 222 has its width in the vertical direction being reduced, and the third region 223 has its width in the vertical direction being extended by the reduced amount. In this case, the pointer 301 is located at the pointer movement point 3031. The layout L104H and the layout L104 can be mutually transitioned from one another. In the layout L104L, as compared to the layout L104, the second region 222 has its width in the vertical direction being extended, and the third region 223 has its width in the vertical direction being reduce by the extended amount. In this case, the pointer 301 is located at the pointer movement point 3033. The layout L104L and the layout L104 can be mutually transitioned from one another.

In addition, as illustrated in the figure, the layout L101H can be transitioned to the layout L102H, and the layout L101L can be transitioned to the layout L102L. The layout L102H can be transitioned to the layout L103H, and the layout L102L can be transitioned to the layout L103L. The layout L103H can be transitioned to the layout L104H, and the layout L103L can be transitioned to the layout L104L. The layout L104H and the layout L101H can be mutually transitioned from one another, and the layout L104L and the layout L101L can be mutually transitioned from one another.

Note that, in addition to the transition described above, for example, transition of the layouts in which both of the x coordinate and the y coordinate of the pointer 301 are changed may be permitted, such as in the transition from the layout L101H to the layout L102 or the layout L102L.

<Layout Transition Processing According to Second Operation Example>

Figure 14:
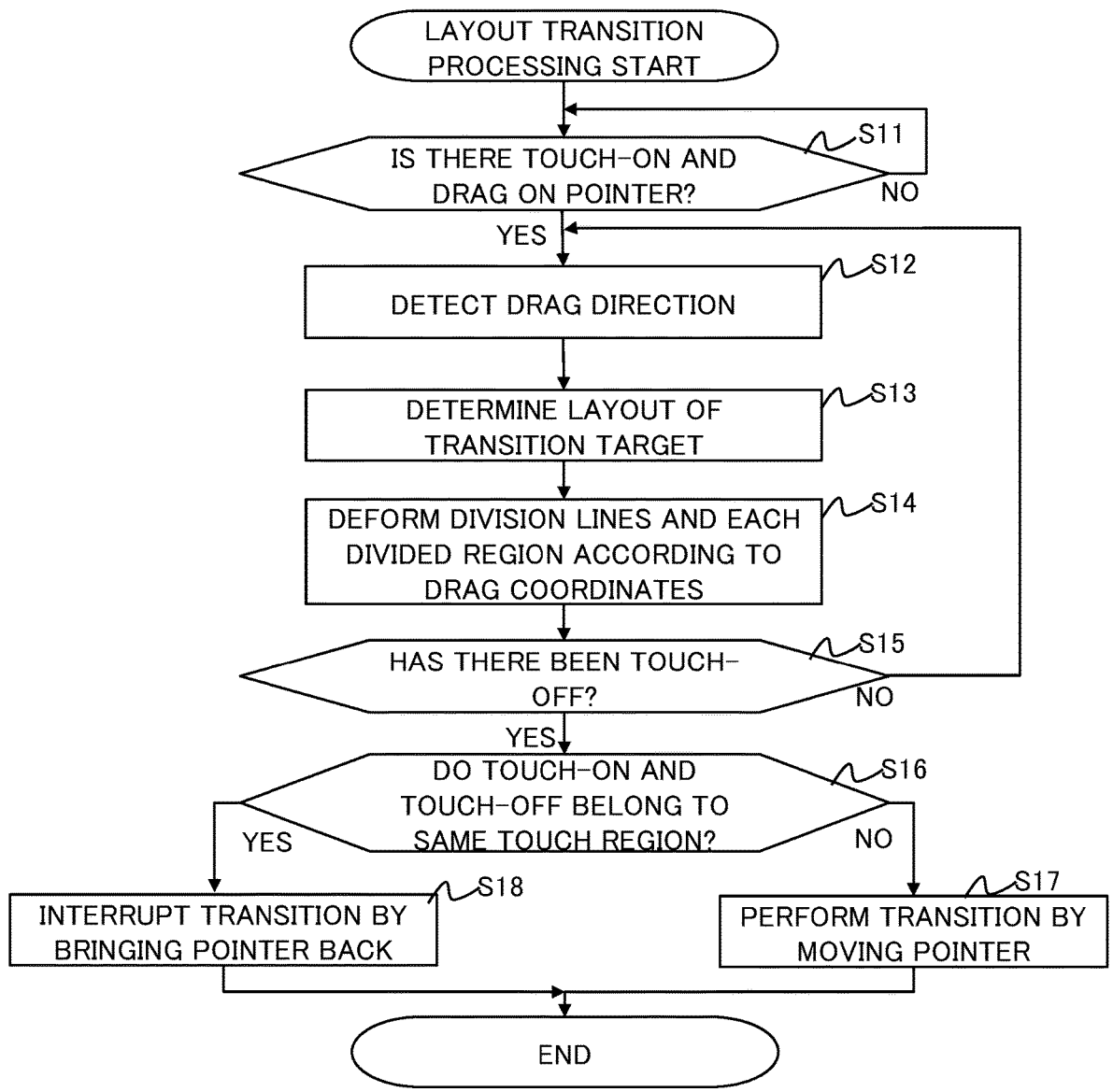
FIG. 14 is a flowchart illustrating an example of layout transition processing according to a second operation example.

Next, FIG. 14 is a flowchart illustrating an example of layout transition processing according to the second operation example.

The layout transition processing is, for example, started after an ignition switch of a vehicle is turned on, the onboard device 10 is started, and predetermined information is displayed in each divided region provided in the display screen of the first display 21. The layout transition processing is, for example, repeatedly executed until the ignition switch of the vehicle is then turned off and operation of the onboard device 10 ends.

First of all, the operation detection unit 122 monitors touch operation on the first display 21 (touch panel 251 stacked thereon), and determines whether or not there is touch-on and drag on the pointer 301 from the user (Step S11). Here, if the operation detection unit 122 determines that there is no operation of touch-on and drag (NO in Step S11), the operation detection unit 122 continues to monitor the touch operation on the touch panel 251.

In contrast, if the operation detection unit 122 determines that there is operation of touch-on and drag on the pointer 301 (YES in Step S11), the operation detection unit 122 starts notifying the layout setting unit 123 of the dragged xy coordinates, and also detects a drag direction and notifies the layout setting unit 123 of the drag direction (Step S12). Note that the drag direction may be detected as an upward direction (−y-axis direction), a downward direction (+y-axis direction), a rightward direction (+x-axis direction), or a leftward direction (−x-axis direction). For example, when the user drags in an oblique direction, a drag direction having the larger absolute value out of the x-axis direction component and the y-axis direction component may be detected as the drag direction.

When an operation reception button is displayed in the display screen at the position where the touch-on is performed, in a manner similar to the first operation example, operation on the operation reception button performed by the user may be prioritized, and the transition of the layouts is not executed. This can prevent transition of the layouts unintended by the user when the user performs touch operation not with the intention of transitioning the layouts.

Next, the layout setting unit 123 refers to the transition table 133 stored in the storage unit 130 and determines the layout of the transition target, based on the drag direction for the pointer 301 (Step S13). Note that, in the present embodiment, the transition table 133 is used as a determination condition for determining the layout of the transition target. However, the determination condition for determining the layout of the transition target is not limited thereto. As long as the touch operation and the layout of the transition target are associated with each other in advance and can be used as the determination condition, there is no limitation on how the information is arranged.

Here, the transition table 133 will be described. FIG. 15 illustrates an example of the transition table 133 corresponding to the second operation example. The transition table 133 is information (transition information) for determining the layout of the transition target. The transition table 133 records the layout before transition, the touch operation, and the layout of the transition target in association with each other.

For example, when the layout before transition is L101 and drag in the rightward direction is detected, the layout of the transition target is determined as L102. Further, for example, when the layout before transition is L101 and drag in the leftward direction is detected, the layout of the transition target is determined as L104. In addition, for example, when the layout before transition is L1 and drag in the upward direction is detected, the layout of the transition target is determined as L101H.

In addition, for example, when there are no records in the transition table 133, such as when the layout before transition is L102 and drag in the leftward direction is detected, transition according to the drag is not performed. In this case, the layout transition processing is forcibly ended, and the processing is started from Step S11 again (not illustrated).

FIG. 14 is referred to again. As described above, after the layout setting unit 123 determines the layout of the transition target, the layout setting unit 123 subsequently displays a state in which the division lines 302 are deformed as if the division lines 302 are stretched like an elastic object, such as a rubber band, that is connected to the pointer 301 and the shape of each divided region is also deformed along with the deformation of the division lines 302, so that the layout gradually becomes closer to the layout of the transition target according to the drag operation of the user (Step S14).

Next, the operation detection unit 122 determines whether or not the user has performed touch-off (whether or not the user is still performing the drag) (Step S15). Here, if the operation detection unit 122 determines that the user has not performed touch-off (NO in Step S15), the processing is brought back to Step S12. Then, with the repetition of the processing of Steps S12 to S15, the display of the deformation of the division lines 302 and each divided region performed by the layout setting unit 123 is continued so that the layout gradually becomes closer to the layout of the transition target.

Subsequently, if the operation detection unit 122 determines that the user has performed touch-off (YES in Step S15), the operation detection unit 122 notifies the layout setting unit 123 that the touch-off has been performed and of the xy coordinates of the touch-off.

Next, according to the notification that the touch-off has been performed, the layout setting unit 123 refers to the pointer information 135 in the storage unit 130 and determines whether or not the xy coordinates of the touch-on and the xy coordinates of the touch-off belong to the same touch region ta (Step S16). Here, if the layout setting unit 123 determines that the xy coordinates of the touch-on and the xy coordinates of the touch-off do not belong to the same touch region ta (NO in Step S16), the layout setting unit 123 refers to the pointer information 135, identifies the pointer movement point 303 of the touch region ta to which the xy coordinates of the touch-off belong, and instantaneously moves the pointer 301 to the identified pointer movement point 303, so as to complete the transition of the layout (Step S17).

In contrast, when the layout setting unit 123 determines that the xy coordinates of the touch-on and the xy coordinates of the touch-off belong to the same touch region ta (YES in Step S16), the layout setting unit 123 instantaneously brings the pointer 301 back to the xy coordinates of the touch-on, so as to interrupt the transition of the layout and bring the layout back to the state before the transition (Step S18). Through the above process, the layout transition processing according to the second operation example ends.

According to the layout change processing according to the second operation example described above, the user can transition the layouts having different sizes and positional relationships of a plurality of divided regions by touching and dragging the pointer 301 displayed in the first display 21. The user can display information by using both of the first display 21 and the second display 22 as in the layout L104, and can further bring the divided region(s) that has once been moved to the second display 22 back to the first display 21. The onboard device 10 can display the transition process while deforming the division lines 302 and each divided region when the layouts are transitioned.

<Modifications of Operation>

In the description provided in the above, regarding the display in each divided region, the contents of information to be displayed can be changed according to the size of each divided region. However, an information amount to be displayed, in other words, an information amount that can be seen by the user, may be changed according to the size of each divided region without changing the contents of the information to be displayed.

FIG. 16 illustrates an example in which the information amount to be displayed is changed according to the size of each divided region without changing the contents of the information to be displayed. Note that the example of the figure illustrates a case in which transition from the layout L103 to the layout L102, which cannot be transitioned in the second operation example described above, is possible, and the contents of the information to be displayed in each of the first region 211 in the layout L103 and the first region 211 in the layout L102 are the same. In the layout L102, the first region 211 is larger than the layout L103 in size. Accordingly, even when the same information is displayed, a larger information amount can be displayed.

In this case, when the user touches and drags the pointer 301 in the rightward direction in the layout L103, the user can visually recognize information with an increased information amount being displayed in the first region 211 that is deformed into a pentagonal shape while the user drags the pointer 301. When the user subsequently changes the drag back to the leftward direction and performs touch-off, the layout can be brought back to L103 without transitioning the layout to L102.

The effects described in the present specification are merely examples, and are not limited thereto. Other effects may be exerted.

The present invention is not limited to the embodiment described above, and includes various modification examples. For example, each of the embodiments described above is described in detail for the sake of easier understanding of the present invention, and the present invention is not necessarily limited to including all the configurations described herein. It is possible to replace a part of a configuration of one embodiment with a configuration of another embodiment. It is also possible to add a configuration of one embodiment to a configuration of another embodiment. Another configuration can be added to, deleted from, and replaced with a part of a configuration of each embodiment.

A part of or an entirety of the configurations, functions, processing units, processing means, and the like described above may be implemented by hardware by designing those with, for example, integrated circuits or the like. Each of the configurations, functions and the like described above may be implemented by software by a processor that interprets and executes programs for achieving each function. Information for achieving each of the functions, such as a program, a determination table, and a file may be placed in a storage device such as a memory, an HDD, and a solid state disk (SSD), and a recording medium such as an IC card, a secure digital (SD) card, and a DVD. Illustrations of control lines and information lines are those considered to be necessary for the sake of description, and not necessarily include all the control lines and information lines necessary as a product. In actuality, it may be considered that almost all the configurations are connected to each other.

In addition to the information control device and the display change method, the present invention may be provided in various forms such as a computer-readable program.

REFERENCE SIGNS LIST

10: Onboard device
11: Arithmetic processing device
21: First display
22: Second display
23: Storage device
24: Voice input/output device
25: Input device
26: ROM device
27: Vehicle speed sensor
28: Gyro sensor
29: GPS reception device
30: FM multiplex broadcasting reception device
31: Beacon reception device
111: CPU
112: RAM
113: ROM
114: I/F
115: Bus
120: Control unit
121: Input reception unit
122: Operation detection unit
123: Layout setting unit
124: Display information generation unit
125: Function processing unit
130: Storage unit
131: Map information
132: Layout information
133: Transition table
134: Animation information
135: Pointer information
211: First region
212: Second region
213: Third region
221: First region
222: Second region
223: Third region
241: Microphone
242: Speaker
251: Touch panel
252: Dial switch
301: Pointer
302: Division line
303: Pointer movement point
ta: Touch region

The invention claimed is:

1. An information display control device comprising:
one or more processors and one or more non-transitory computer-readable storage media, the one or more non-transitory computer-readable storage media having stored thereon at least:
an operation detection unit configured to detect a drag operation of a user performed on a pointer displayed at an intersection of division lines dividing a display screen of a display into three or more divided regions having rectangular shapes, the drag operation comprising a touch-on and a touch-off by the user; and
a layout setting unit configured to transition display of the display between a plurality of layouts set in advance according to the drag operation, wherein
during a transition process between the plurality of layouts, the layout setting unit moves the pointer and deforms the division lines and the three or more divided regions of a first layout by imitating an elastic object according to the drag operation so that the three or more divided regions are deformed into trapezoid shapes, having one set of opposite sides parallel and another set of opposite sides not parallel or pentagonal shapes by stretching the division lines by the pointer, and
based on a distance of the drag operation from touch-on to touch-off, the transition process between the layouts is completed either by transforming each of the three or more divided regions where at least one of the divided regions has been transformed into the trapezoidal shape or the pentagonal shape, into rectangular shapes different than the first layout, or by returning the three or more divided regions to the first layout.

2. The information control device according to claim 1, wherein
as the transition process of the plurality of layouts, the layout setting unit deforms one of the division lines being in parallel with an axial direction of the display by extending the one of the division lines in an oblique direction being not in parallel with the axial direction of the display according to drag as the touch operation performed on the pointer.

3. The information control device according to claim 1, the one or more non-transitory computer-readable storage media having further stored thereon
- a storage unit configured to store transition information in which a layout before transition among the plurality of layouts, the touch operation, and a layout of a transition target among the plurality of layouts are associated with each other, wherein
- the layout setting unit refers to the transition information, and determines the layout of the transition target, based on a direction of the drag being detected as the touch operation.

4. The information control device according to claim 1, the one or more non-transitory computer-readable storage media having further stored thereon
- a display information generation unit configured to generate information to be displayed in the three or more divided regions, wherein
- the display information generation unit changes a content of the information to be displayed according to sizes of the three or more divided regions.

5. The information control device according to claim 1, the one or more non-transitory computer-readable storage media having further stored thereon
- a display information generation unit configured to generate information to be displayed in the three or more divided regions, wherein
- the display information generation unit changes an information amount to be displayed according to sizes of the three or more divided regions without changing a content of the information to be displayed.

6. A display change method performed by an information control device, comprising:
- an operation detection step of detecting drag operation of a user performed on a pointer displayed at an intersection of division lines dividing a display screen of a display into three or more divided regions having rectangular shapes, the drag operation comprising a touch-on and a touch-off by the user; and
- a layout setting step of transitioning display of the display between a plurality of layouts set in advance according to the drag operation, wherein
- during a transition process between the plurality of layouts, the layout setting step includes moving the pointer and deforming the division lines and the three or more divided regions of a first layout imitating an elastic object according to the drag operation so that the three or more divided regions are deformed into trapezoid shapes, having one set of opposite sides parallel and another set of opposite sides not parallel or pentagonal shapes by stretching the division lines by the pointer, and
- based on a distance of the drag operation from touch-on to touch-off, completing the transition process between the layouts either by transforming each of the three or more divided regions where at least one of the divided regions has been transformed into the trapezoidal shape or the pentagonal shape, into rectangular shapes different than the first layout, or by returning the three or more divided regions to the first layout.

7. The display change method according to claim 6, wherein
- as the transition process of the plurality of layouts, the layout setting step includes deforming one of the division lines being in parallel with an axial direction of the display by extending the one of the division lines in an oblique direction being not in parallel with the axial direction of the display according to drag as the touch operation performed on the pointer.

8. The display change method according to claim 6, wherein
- the layout setting step includes referring to transition information in which a layout before transition among the plurality of layouts, the touch operation, and a layout of a transition target among the plurality of layouts are associated with each other, and determining the layout of the transition target based on a direction of the drag being detected as the touch operation.

9. The display change method according to claim 6, further comprising
- a display information generation step of changing a content of information to be displayed in the three or more divided regions according to sizes of the three or more divided regions.

10. The display change method according to claim 6, further comprising
- a display information generation step of changing an information amount without changing a content of information to be displayed in the three or more divided regions.

* * * * *